US009462497B2

(12) United States Patent
Hicks et al.

(10) Patent No.: US 9,462,497 B2
(45) Date of Patent: Oct. 4, 2016

(54) SUBSCRIBER DATA ANALYSIS AND GRAPHICAL RENDERING

(75) Inventors: Patrick Hicks, Milton, GA (US); Peter Andrew Johnson, Marietta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 739 days.

(21) Appl. No.: 13/175,199

(22) Filed: Jul. 1, 2011

(65) Prior Publication Data

US 2013/0002675 A1    Jan. 3, 2013

(51) Int. Cl.
*H04W 4/00* (2009.01)
*G01R 31/08* (2006.01)
*H04L 12/24* (2006.01)
*H04W 24/08* (2009.01)

(52) U.S. Cl.
CPC .................................. *H04W 24/08* (2013.01)

(58) Field of Classification Search
USPC .......................................................... 345/440
See application file for complete search history.

(56) References Cited

U.S. PATENT DOCUMENTS

| | | | |
|---|---|---|---|
| 4,718,081 A | 1/1988 | Brenig | |
| 5,515,062 A | 5/1996 | Maine et al. | |
| 5,724,660 A | 3/1998 | Kauser et al. | |
| 5,732,354 A | 3/1998 | MacDonald | |
| 5,732,383 A | 3/1998 | Foladare et al. | |
| 5,831,545 A | 11/1998 | Murray et al. | |
| 5,844,521 A | 12/1998 | Stephens et al. | |
| 5,982,324 A | 11/1999 | Watters et al. | |
| 6,018,312 A | 1/2000 | Haworth | |
| 6,026,301 A | 2/2000 | Satarasinghe | |
| 6,058,260 A | 5/2000 | Brockel et al. | |
| 6,108,532 A | 8/2000 | Matsuda et al. | |
| 6,108,556 A | 8/2000 | Ito | |
| 6,125,125 A | 9/2000 | Narasimha et al. | |
| 6,148,219 A | 11/2000 | Engelbrecht et al. | |
| 6,216,002 B1 | 4/2001 | Holmring | |
| 6,230,018 B1 | 5/2001 | Watters et al. | |
| 6,256,577 B1 | 7/2001 | Graunke | |
| 6,263,190 B1 | 7/2001 | Mamori et al. | |

(Continued)

FOREIGN PATENT DOCUMENTS

| | | |
|---|---|---|
| EP | 0856746 A2 | 8/1998 |
| EP | 1145526 | 10/2001 |

(Continued)

OTHER PUBLICATIONS

Notice of Allowance mailed Aug. 12, 2013, for U.S. Appl. No. 13/174,541, 40 pages.

(Continued)

*Primary Examiner* — David H Chu
(74) *Attorney, Agent, or Firm* — Amin, Turocy & Watson, LLP

(57) ABSTRACT

Analysis and graphical rendering of subscriber data is provided. A data analysis component is provided that obtains a set of subscriber data, correlates various subsets of the subscriber data to determine a plurality of data relationships, and graphical renders the subscriber data as a heat map, a fractal map, a tree map, a three dimensional plot, a three dimensional map, a graph, a chart, etc. based on a scale associated with the data relationships. In addition, the data analysis component can obtain a set of line number portability data that can be correlated with the various subsets of the subscriber data to determine the data relationships.

20 Claims, 17 Drawing Sheets

(56) References Cited

U.S. PATENT DOCUMENTS

| | | |
|---|---|---|
| 6,292,665 B1 | 9/2001 | Hildebrand et al. |
| 6,298,233 B1 | 10/2001 | Souissi et al. |
| 6,307,503 B1 | 10/2001 | Liu et al. |
| 6,311,078 B1 | 10/2001 | Hardouin |
| 6,317,686 B1 | 11/2001 | Ran |
| 6,321,092 B1 | 11/2001 | Fitch et al. |
| 6,330,459 B1 | 12/2001 | Crichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,915,123 B1 | 7/2005 | Daudelin et al. |
| 6,933,100 B2 | 8/2005 | Igawa et al. |
| 6,933,860 B1 | 8/2005 | Gehman et al. |
| 7,058,710 B2 | 6/2006 | McCall et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2* | 6/2011 | Abbadessa et al. ......... 705/7.38 |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,050,690 B2 | 11/2011 | Neeraj |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 | 3/2012 | Olson |
| 8,161,075 B1* | 4/2012 | Long et al. .................. 707/793 |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,300,663 B2 | 10/2012 | Chion et al. |
| 8,307,030 B1* | 11/2012 | Hu .............................. 709/203 |
| 8,326,682 B2 | 12/2012 | Redford et al. |
| 8,355,364 B1 | 1/2013 | Vargantwar et al. |
| 8,355,865 B2 | 1/2013 | Wagner et al. |
| 8,417,264 B1 | 4/2013 | Whitney et al. |
| 8,469,274 B2 | 6/2013 | Tseng et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes |
| 8,612,410 B2 | 12/2013 | Meredith et al. |
| 8,666,388 B2 | 3/2014 | Catovic et al. |
| 8,666,390 B2 | 3/2014 | Meredith et al. |
| 8,761,799 B2 | 6/2014 | Meredith et al. |
| 8,897,805 B2 | 11/2014 | Fix et al. |
| 8,909,247 B2 | 12/2014 | Tipton et al. |
| 9,008,684 B2 | 4/2015 | Tipton et al. |
| 9,008,698 B2 | 4/2015 | Meredith et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0040323 A1 | 2/2003 | Pihl et al. |
| 2003/0092448 A1 | 5/2003 | Forstrom et al. |
| 2003/0095065 A1 | 5/2003 | Ericson et al. |
| 2003/0097330 A1 | 5/2003 | Hillmer et al. |
| 2003/0115228 A1 | 6/2003 | Horvitz et al. |
| 2003/0115260 A1 | 6/2003 | Edge |
| 2003/0125046 A1 | 7/2003 | Riley et al. |
| 2003/0158924 A1* | 8/2003 | DeLegge ..................... 709/223 |
| 2003/0222819 A1* | 12/2003 | Karr et al. ................... 342/457 |
| 2003/0225508 A9 | 12/2003 | Petzold et al. |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Duri et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0200303 A1 | 9/2006 | Fuentes et al. |
| 2006/0240839 A1 | 10/2006 | Chen et al. |
| 2006/0240841 A1 | 10/2006 | Bhattacharya |
| 2006/0267841 A1 | 11/2006 | Lee et al. |

(56) References Cited

U.S. PATENT DOCUMENTS

| | | |
|---|---|---|
| 2006/0270419 A1 | 11/2006 | Crowley et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1* | 1/2008 | Schneider ............... 709/223 |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1* | 3/2008 | Downs et al. ............ 701/117 |
| 2008/0076450 A1 | 3/2008 | Nanda et al. |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0313157 A1* | 12/2010 | Carlsson et al. ............... 715/769 |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0039593 A1 | 2/2011 | Lee et al. |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly |
| 2011/0076975 A1 | 3/2011 | Kim et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0087338 A1 | 4/2012 | Brandt et al. |
| 2012/0139782 A1 | 6/2012 | Gutt et al. |
| 2012/0144452 A1 | 6/2012 | Dyor et al. |
| 2012/0144457 A1 | 6/2012 | Counterman |
| 2012/0158289 A1 | 6/2012 | Bernheim Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0214509 A1 | 8/2012 | Levin et al. |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier et al. |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023247 A1 | 1/2013 | Bolon et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0066748 A1 | 3/2013 | Long |
| 2013/0095861 A1 | 4/2013 | Li et al. |
| 2013/0096966 A1 | 4/2013 | Barnes |
| 2013/0109407 A1 | 5/2013 | Tipton et al. |
| 2013/0137464 A1 | 5/2013 | Kramer et al. |
| 2013/0226451 A1 | 8/2013 | O'Neill et al. |
| 2013/0281111 A1 | 10/2013 | Syrjarinne et al. |
| 2013/0324149 A1 | 12/2013 | Fix et al. |
| 2013/0337824 A1 | 12/2013 | Meredith et al. |
| 2014/0062782 A1 | 3/2014 | Abraham |

(56) References Cited

U.S. PATENT DOCUMENTS

| | | |
|---|---|---|
| 2014/0106779 A1 | 4/2014 | Arslan et al. |
| 2014/0122220 A1 | 5/2014 | Bradley et al. |
| 2014/0171060 A1 | 6/2014 | Cook et al. |
| 2014/0278744 A1 | 9/2014 | Lo Faro et al. |

FOREIGN PATENT DOCUMENTS

| | | |
|---|---|---|
| JP | 2004069609 | 3/2004 |
| JP | 2005091303 A | 4/2005 |
| JP | 2007328050 A | 12/2007 |
| WO | WO2006031035 A1 | 3/2006 |

OTHER PUBLICATIONS

Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, © 2007 Routeware and Higher Mapping Solutions, 71 pages, downloaded from http://www.routeware.dk/download/routefinder_arcgis_pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
"Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages.".
"Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages."
"Drucker, et al. Support Vector Regression Machines.http://scholar.google.com/scholar?q=%22Support+Vector+Regression+Machines.%22. Last accessed Dec. 24, 2010, 7 pages."
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
International Search Report for PCT Application No. US2011/026122 Sep. 10, 2011, 11 pages.
International Search Report for PCT Application No. US2011/026120 dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-. . . 1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.

(56) References Cited

OTHER PUBLICATIONS

Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system, 7 pages.
Koukoumidis Emmanouil, Peh Li-Shiuan, Martonosi Margaret, SignalGuru: Leveraging Mobile Phones for Collaborative Traffic Signal Schedule Advisory. 14 pages.
Bitcarrier Technology. Published online at http://www.bitcarrier.com/technology. 1 page.
Hao Peng, Ban Xuegang(Jeff). Estimating Vehicle Position in a Queue at Signalized Intersections Using Simple Travel Times from Mobile Sensors. 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
OA dated Oct. 2, 2012 for U.S. Appl. No. 13/554,285, 19 pages.
OA dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
OA dated Jul. 30, 2012 for U.S. Appl. No. 12/967,747, 28 pages.
OA dated Jul. 17, 2012 for U.S. Appl. No. 13/220,083, 57 pages.
OA dated Sep. 11, 2012 for U.S. Appl. No. 13/188,345, 44 pages.
OA dated Oct. 15, 2012 for U.S. Appl. No. 13/523,778, 21 pages.
OA dated Dec. 20, 2012 for U.S. Appl. No. 12/958,146, 23 pages.
OA dated Dec. 28, 2012 for U.S. Appl. No. 13/188,295, 37 pages.
OA dated Jan. 3, 2013 for U.S. Appl. No. 13/188,300, 36 pages.
OA dated Nov. 8, 2012 for U.S. Appl. No. 13/204,535, 30 pages.
Final Office Action dated Jan. 25, 2013, for U.S. Appl. No. 13/554,285, 20 pgs.
Non-Final Office Action dated Mar. 19, 2013, for U.S. Appl. No. 13/174,541, 46 pgs.
Final Office Action dated Feb. 13, 2013, for U.S. Appl. No. 13/220,083, 48 pgs.
Final Office Action dated Feb. 22, 2013, for U.S. Appl. No. 13/188,345, 45 pgs.
Final Office Action dated Mar. 15, 2013, for U.S. Appl. No. 13/204,535, 18 pgs.
Non-Final Office Action dated Mar. 19, 2013, for U.S. Appl. No. 13/284,497, 46 pgs.
Non-Final Office Action dated Apr. 19, 2013, for U.S. Appl. No. 13/277,595, 58 pages.
Non-Final Office Action dated Jun. 6, 2014 for U.S. Appl. No. 13/447,072, 25 pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved from http://search.credoreference.com/content/entry/hcengdict/represent/0, 2 pages.
Represent. (2001). In Chambers 21 st century dictionary. Retrieved from http://search.credoreference.com/content/entry/chambdict/represent/O.
Represent. (2011). In the american heritage dictionary of the english language. Retrieved from http://search.credoreference.com/content/entry/hmdictenglang/represent/0.
Non-Final Office Action dated May 20, 2014 for U.S. Appl. No. 13/551,369, 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Mar. 25, 2014 for U.S. Appl. No. 13/488,144, 60 Pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Final Office Action dated Apr. 3, 2014 for U.S. Appl. No. 13/188,295, 37 pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
Office Action dated Aug. 11, 2014 for U.S. Appl. No. 14/279,176, 22 pages.
Marko Silventoinen, et al., "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.

(56) References Cited

OTHER PUBLICATIONS

Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements.
3GPP TS 25.331 V6.9.0 (Mar. 2006) RRC protocol for the UE-UTRAN radio interface.
3GPP TS 25.413 V6.9.0 (Mar. 2006) UTRAN Iu interface RANAP signalling.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Office Action dated Apr. 16, 2015 for U.S. Appl. No. 14/521,431, 82 pages.
Notice of Allowance dated Mar. 19, 2015 for U.S. Appl. No. 13/494,959, 41 pages.
Notice of Allowance dated Mar. 26, 2015 for U.S. Appl. No. 14/276,688, 75 pages.
Office Action dated May 1, 2015 for U.S. Appl. No. 13/557,425, 33 pages.
Office Action dated May 14, 2015 for U.S. Appl. No. 14/530,605, 72 pages.
Office Action dated Jun. 1, 2015 for U.S. Appl. No. 13/447,072, 38 pages.
Office Action dated Jun. 2, 2015 for U.S. Appl. No. 14/516,286, 20 pages.
Office Action dated May 20, 2015 for U.S. Appl. No. 13/526,988, 52 pages.
Office Action dated Jun. 9, 2015 for U.S. Appl. No. 13/495,756, 35 pages.
Notice of Allowance dated Jul. 8, 2015 for U.S. Appl. No. 14/548,901, 125 pages.
Buford, et al., Location Privacy Enforcement in a Location-Based Services Platform, IEEE, 2009, 978-1-4244-2309-5/09/$25.00 © 2009 IEEE. Retrieved on Jul. 29, 2015, 5 pages.
Philips, Jr. et al., Information Sharing and Security in Dynamic Coalitions, ACM, 2002. Retrieved on Jul. 29, 2015, 10 pages.
Moniruzzaman, et al., "A Study of Privacy Policy Enforcement in Access Control Models", Proceedings of 13th International Conference on Computer and Information Technology (ICCIT 2010), © 2010 IEEE. Retrieved on Jul. 29, 2015, 6 pages.
Office Action dated Jul. 22, 2015 for U.S. Appl. No. 13/188,136, 31 Pages.
"CELL_DCH", in INACON Glossary, published online at [http://www.inacon.de/glossary/CELL_DCH.php] retrieved on Jul. 22, 2015, 1 page.
Office Action dated Sep. 17, 2015 for U.S. Appl. No. 13/495,756, 23 Pages.
Office Action dated Sep. 14, 2015 for U.S. Appl. No. 13/557,425, 32 Pages.
Office Action dated Sep. 18, 2015 for U.S. Appl. No. 14/641,247, 69 Pages.
Notice of Allowance dated Aug. 27, 2015 for U.S. Appl. No. 14/521,431, 39 Pages.
Notice of Allowance dated Aug. 21, 2014 for U.S. Appl. No. 13/447,069, 78 pages.
Office Action dated Aug. 28, 2014 for U.S. Appl. No. 13/526,988, 83 pages.
Office Action dated Oct. 22, 2014 for U.S. Appl. No. 13/557,425, 59 pages.
Office Action dated Oct. 17, 2014 for U.S. Appl. No. 13/204,535, 47 pages.
Office Action dated Oct. 20, 2014 for U.S. Appl. No. 13/494,959, 64 pages.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.
Office Action dated Dec. 1, 2014 for U.S. Appl. No. 13/495,756, 76 pages.
Office Action dated Jan. 7, 2015 for U.S. Appl. No. 13/557,425, 30 pages.
Girardin, et al., "Digital footprinting: Uncovering tourists with user generated content." Pervasive Computing, IEEE 7.4, Oct.-Nov. 2008. 8 pages.
Steinfield, "The development of location based services in mobile commerce." ELife after the Dot Com Bust. PhysicaVerlagHD, 2004. 15 pages.
Sevtsuk, et al., "Does urban mobility have a daily routine? Learning from the aggregate data of mobile networks." Journal of Urban Technology, vol. 17, No. 1, Apr. 2010: 20 pages.
Buhalis, et al., "Information communication technology revolutionizing tourism." Tourism Recreation Research, vol. 30, No. 3, 2005. 10 pages.
Ratti, et al. "Mobile Landscapes: using location data from cell phones for urban analysis." Environment and Planning B: Planning and Design, vol. 33, 2006, 23 pages.
Notice of Allowance mailed Jan. 21, 2015 for U.S. Appl. No. 13/495,391, 98 pages.
Notice of Allowance mailed Feb. 6, 2015 for U.S. Appl. No. 13/204,535, 20 pages.
Office Action dated Feb. 13, 2015 for U.S. Appl. No. 14/516,286, 62 pages.
Office Action dated Feb. 13, 2015 for U.S. Appl. No. 13/188,136, 44 pages.
Office Action dated Nov. 16, 2015 for U.S. Appl. No. 13/188,136, 31 pages.
"Error", The American Heritage(R) Dictionary of the English Language, 2011, Houghton Mifflin Company, Boston, MA, 2 pages. Retrieved on Nov. 16, 2015 from http://search.credoreference.com/contentientry/hmdictenglang/error/O.
Office Action dated Nov. 23, 2015 for U.S. Appl. No. 14/520,287, 80 pages.
Office Action dated Nov. 16, 2015 for U.S. Appl. No. 14/566,657, 87 pages.
Office Action dated Nov. 30, 2015 for U.S. Appl. No. 13/447,072, 45 pages.
Office Action dated Dec. 18, 2015 for U.S. Appl. No. 14/548,901, 35 pages.
Office Action dated Dec. 31, 2015 for U.S. Appl. No. 14/952,609, 32 pages.
Office Action dated Dec. 1, 2015 for U.S. Appl. No. 13/526,988, 43 pages.
Office Action dated Mar. 11, 2016 for U.S. Appl. No. 14/743,076, 86 pages.
Notice of Allowance dated Mar. 16, 2016 for U.S. Appl. No. 14/520,287, 23 pages.
Office Action dated Mar. 18, 2016 for U.S. Appl. No. 13/447,072, 37 pages.
Office Action dated Apr. 5, 2016 for U.S. Appl. No. 13/188,136, 33 pages.
Office Action dated Apr. 13, 2016 for U.S. Appl. No. 14/877,915, 76 pages.
Office Action dated May 17, 2016 for U.S. Appl. No. 15/074,622, 18 pages.
Office Action dated Jun. 10, 2016 for U.S. Appl. No. 14/548,901, 33 pages.
Office Action dated Jun. 22, 2016 for U.S. Appl. No. 14/970,533, 84 pages.
Office Action dated Jun. 28, 2016 for U.S. Appl. No. 15/132,220, 17 pages.

* cited by examiner

SUBSCRIBER DATA ANALYSIS AND GRAPHICAL RENDERING

TECHNICAL FIELD

The subject disclosure relates to communication systems and, more particularly, to the management and processing of subscriber data in communication systems.

BACKGROUND

A wireless communication system can be utilized to provide wireless access to various communication services (e.g., voice, video, data, messaging, content broadcast, etc.) for users of the system. Wireless communication systems can operate according to a variety of network specifications and/or standards, such as Universal Mobile Telecommunications System (UMTS), Third Generation Partnership Project (3GPP) Long Term Evolution (LTE), High Speed Packet Access (HSPA). These specifications and/or standards use different modulation techniques, such as Code Division Multiple Access (CDMA), Time Division Multiple Access (TDMA), Frequency Division Multiple Access (FDMA), Multi-Carrier CDMA (MC-CDMA), Single-Carrier CDMA (SC-CDMA), Orthogonal Frequency Division Multiple Access (OFDMA), Single-Carrier Frequency Division Multiple Access (SC-FDMA), and so on.

Technological advances have provided significant increases in the computing power and networking capabilities of mobile devices. The technical capabilities of these devices have made them appealing to professionals, students, and casuals users alike. This broad appeal has resulted in the virtual ubiquity of mobile devices, and a constantly expanding volume of wireless subscribers. There are multiple wireless communication service providers constantly competing for these subscribers, and relatively recent technological developments, that enable wireless subscribers to keep their line number when they switch service providers, have made it easier for subscribers to exploit the competition among service providers.

Managing, maintaining, and interpreting the data generated by millions of wireless subscribers is becoming increasingly cumbersome with continual increases in subscriber growth, data usage, and inter-service provider movement. Accordingly, it would be desirable to implement techniques for effectively and efficiently analyzing and rendering subscriber data.

The above-described deficiencies are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

The following presents a simplified summary of the disclosure in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Systems and methods are provided for analyzing and rendering subscriber data. A data analysis component is provided that obtains a set of subscriber data, correlates various subsets of the subscriber data to determine a plurality of data relationships, and graphically renders the subscriber data. In addition, the data analysis component can obtain a set of line number portability data that can be correlated with the various subsets of the subscriber data to determine the data relationships.

In accordance with one aspect, a method is provided for subscriber data analysis that includes the steps of obtaining a set of subscriber data, generating a data relationship by correlating a first subset of the set subscriber data with a second subset of the set of subscriber data, determining a scale having an index value, and displaying the data relationship based at least in part on the scale and the index value.

In accordance with another aspect, a system is provided for analyzing subscriber data that includes an interface component configured to obtain a set of subscriber data, a correlation component configured to evaluate at least a first subset of the subscriber data, and to generate a set of analysis data based at least in part on the evaluation, and a display component configured to graphically render the analysis data.

In accordance with yet another aspect, a method for subscriber data analysis is provided that includes the steps of obtaining a subscriber data, obtaining a line number portability data, generating an analysis data by associating the subscriber data and the line number portability data, determining an index value associated with the analysis data, and displaying the analysis data based at least in part on the index value.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
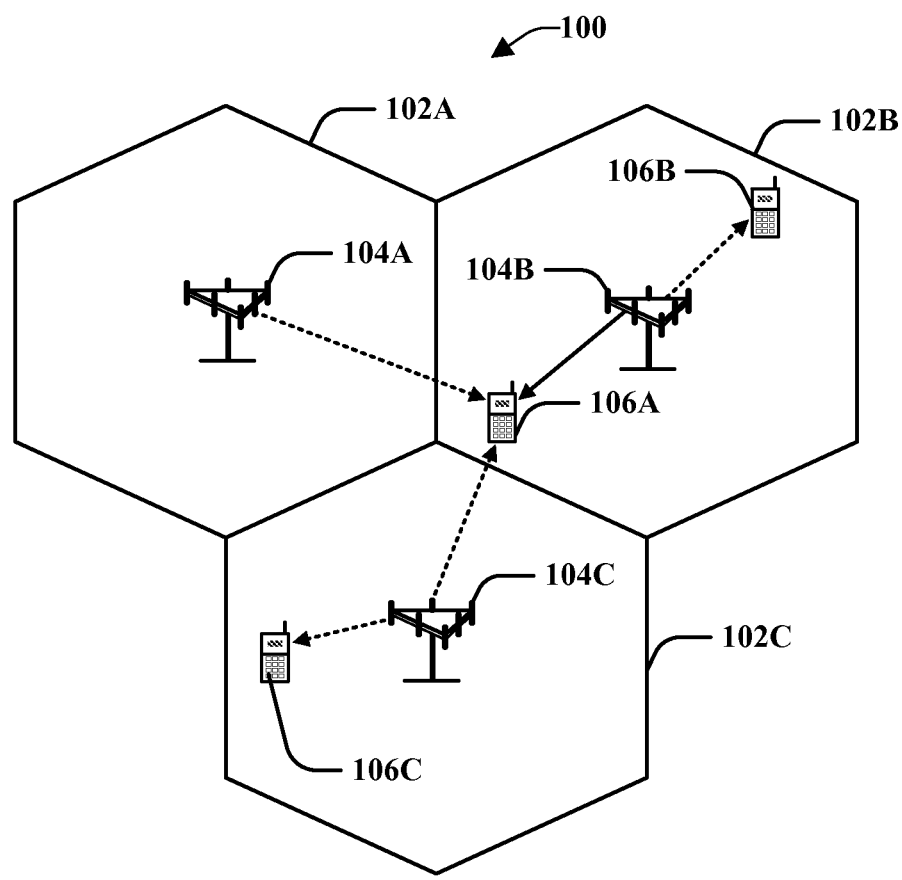
FIG. 1 illustrates an example communications network in accordance with various aspects described herein.

The subject disclosure is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "service," "framework," "interface," "node," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "mobile device," "wireless device," "access terminal," "terminal," "mobile handset," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming data, or substantially any data-stream or signaling-stream from a set of subscriber stations. Data (e.g., content or directives) and signaling streams can be packetized or frame-based flows.

Furthermore, the terms "user," "subscriber," "customer," "consumer," "agent," and the like are employed interchangeably throughout the subject specification, unless context warrants particular distinctions among the terms. It should be appreciated that such terms can refer to human entities or automated components supported through artificial intelligence (e.g., a capacity to make inferences based on complex mathematical formalisms) which can provide simulated vision, sound recognition, and so forth.

FIG. 1 illustrates an example wireless communication system 100 in accordance with various aspects described herein. The wireless communication system 100 can support a plurality of subscribers (e.g., mobile devices, etc.). By way of example, the system 100 provides communication for multiple cells 102A-102C, with each cell being serviced by a corresponding access point (AP) 104 (such as APs 104A-104C). Each cell may be further divided into one or more sectors (e.g. to serve one or more frequencies). Various access terminals (ATs) 106, including ATs 106A-106C, also known interchangeably as user equipment (UE) or mobile devices, are dispersed throughout the system.

Each of the APs 104A-104C can be operated by a single service provider. It is to be appreciated that the wireless communication system 100 can provide service over a geographic region. For example, the cells 102A-102C may cover a few blocks, square acres, or square miles. In addition, it is to be appreciated that a virtually infinite number of cells 102 can be employed to cover a large geographic region, such as a state, country, continent, etc. In this way, a single service provider can enable virtually uninterrupted wireless communication service across a large geographic region.

Figure 2:
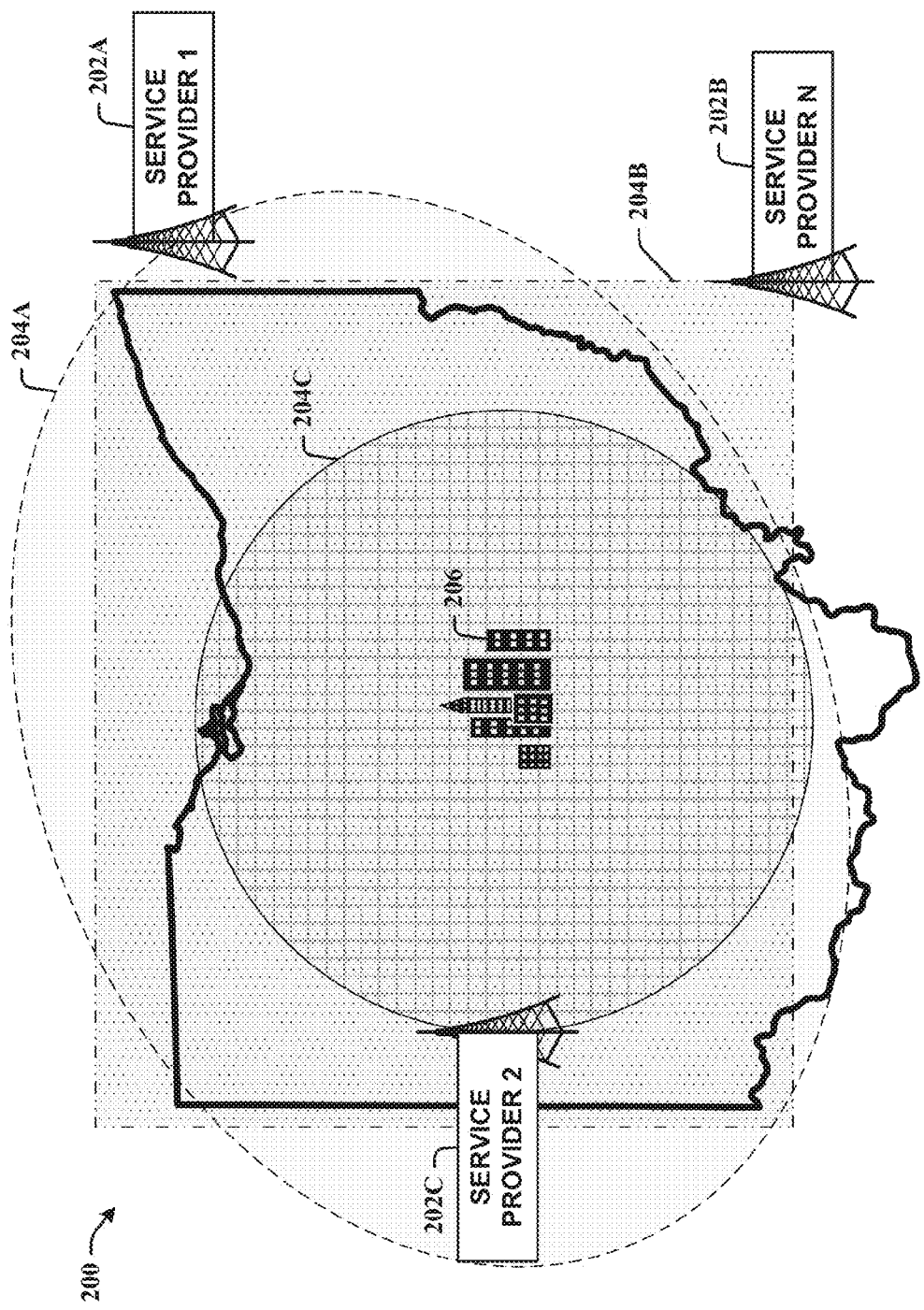
FIG. 2 illustrates an example geographic region in accordance with various aspects described herein.

Turning now to FIG. 2, illustrated is an example geographic region 200 in accordance with various aspects described herein. A plurality of wireless communication service providers (e.g., service providers) 202 (e.g., 202A-C) can enable, facilitate, or otherwise provide wireless communication services in the geographic region 200. Each service provider has a corresponding coverage area 204 (e.g., 204A-C). As illustrated, the respective coverage areas 204A-C of the service providers 202A-C overlap throughout much of the geographic region 200. As a consequence, depending on specific location, a wireless communications user (e.g., subscriber) in the geographic region 200 can select between the service providers 202A-C to provide their wireless service. For example, a sub-region 206 is covered by each of the service providers 202A-C. A plurality of factors may motivate a subscriber in the sub-region 206 to choose one service provider over the others, such as mobile device selection, service quality, pricing, promotions, and so forth.

In addition, subscribers in the sub-region 206 can switch from one service provider to another, at various times. For example, a subscriber of service provider 202A may desire to take advantage of a promotion offered by service provider 202C at the expiration of her service contract. In addition, the subscriber may desire to retain the telephone number (e.g. line number) she previously had with the initial service provider 202A, and the service provider 202A can port the telephone number to service provider 202C when the subscriber switches service providers. In addition, a subscriber's wireless service may be disconnected for a plurality of reasons including, but not limited to, the subscriber's failure to pay their bill, the subscriber no longer desired service, etc.

In view of the foregoing, it can be appreciated that it may be desirable for a service provider to track, analyze and/or maintain data regarding subscriber disconnects (e.g., churn). Furthermore, it is to be appreciated that the geographic region 200 is illustrated as having only three wireless service providers for brevity and simplicity of explanation; however, the geographic region 200 can contain N service providers, wherein N is an integer. In addition, the location of the service providers 202 and their respective coverage areas 204 are illustrated for simplicity of explanation, and are not intended as accurate depictions of wireless communication coverage areas.

Figure 3:
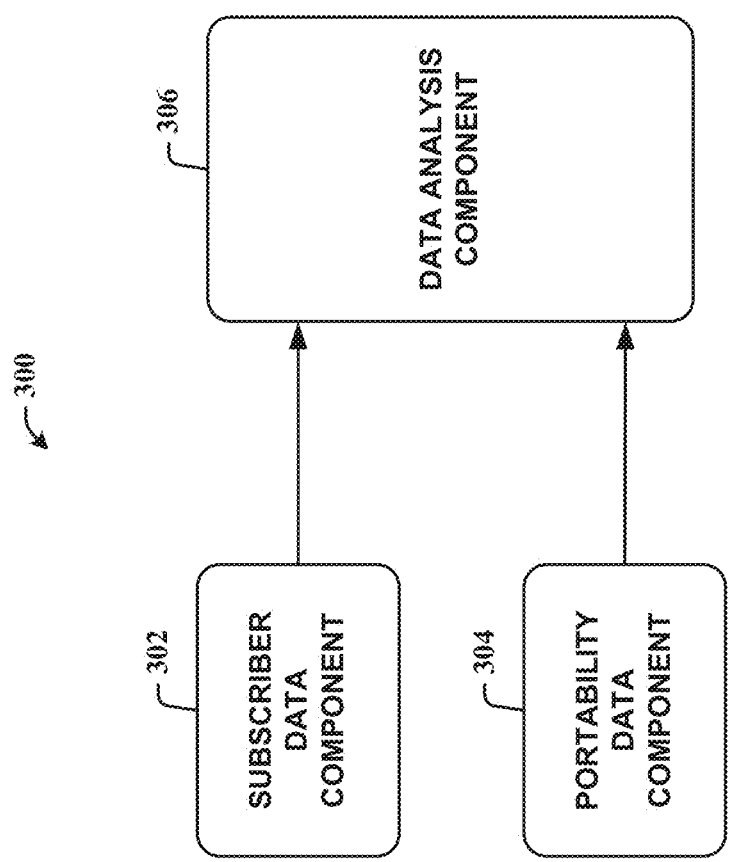
FIGS. 3-4 illustrate example data analysis systems in accordance with various aspects described herein.

Referring to FIG. 3, illustrated is an example data analysis system 300 in accordance with various aspects described herein. The data analysis system 300 includes a subscriber data component 302, a portability data component 304, and a data analysis component 306. The subscriber data component 302 can store, collect, or otherwise maintain a plurality of data associated with subscribers of a wireless service provider (e.g., provider). The data can include, but is not limited to, a subscriber count (e.g., total number of subscribers, current number of active line numbers), a number of disconnects, an identification of equipment associated with each line number (e.g., type of cell phone, smart phone, tablet, laptop, etc), an average revenue per unit, an operating income associated with each subscriber, and so forth (discussed in greater detail below).

The portability data component 304 can store, collect, or otherwise maintain data regarding line number portability between providers. As discussed previously, a subscriber may wish to maintain the same line number when switching service providers, and a first service provider can transfer the subscriber's line number (e.g., port or port over) to a second service provider. The portability data component 304 maintains data regarding the porting of line numbers to and from other carriers. For example, a subscriber having the line number 216-999-9999 can have it ported from a first service provider (e.g., provider 1) to a second service provider (e.g., provider 2). The first service provider can have a portability data component 304 that maintains data regarding the transfer, in particular, that number 216-999-9999 was ported to provider 2. Similarly, the second provider can store data regarding number 216-999-9999 being ported from provider 1.

The subscriber data component 302 and the portability data component 304 can communicate their respective data to the data analysis component 306. The data analysis component 306 can aggregate, combine, or otherwise correlate the data from the subscriber data component 302 and the portability data component 304 to produce analysis regarding subscribers connecting (e.g., new subscribers) or disconnecting from the service provider. For example, the data analysis component 306 can correlate the line numbers associated with disconnects in favor of another service provider, obtained from the portability data component 304, with the identification of the equipment associated with each of the disconnected line numbers, obtained from the subscriber data component 302, in order to determine the number of subscribers having a particular device that have disconnected in favor of the other service provider.

Figure 4:
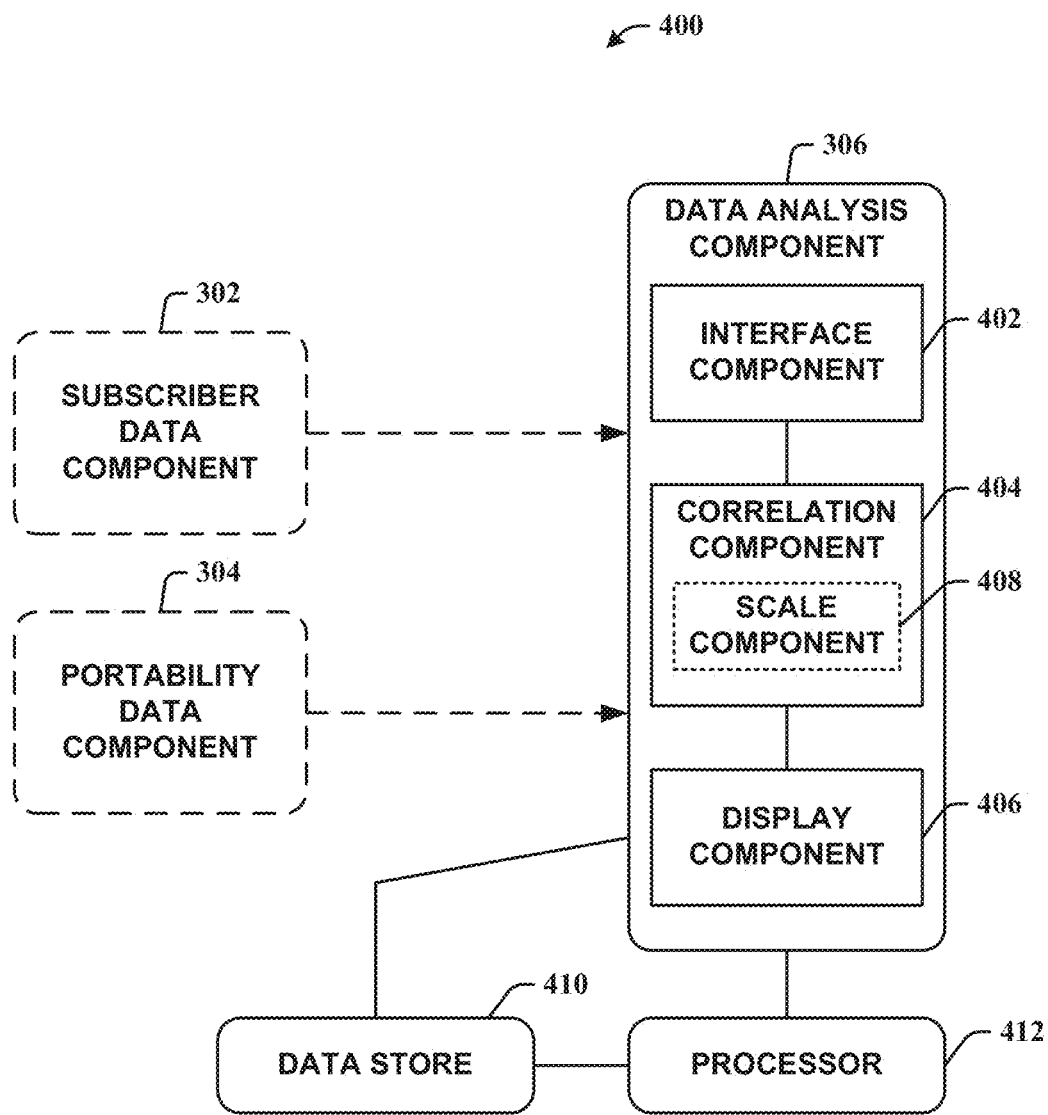

Turning now to FIG. 4, illustrated is an example data analysis system 400 in accordance with various aspects described herein. The data analysis component 306 includes an interface component 402, a correlation component 404, and a display component 406. As discussed previously, the data analysis component 306 can obtain and analyze subscriber data from a subscriber data component 302, and line number portability data from a portability data component 304. The interface component 402 provides various adapters, connectors, channels, communication paths, etc. to integrate the data analysis component 306 into virtually any operating and/or data storage system(s). In addition, the interface component 402 can provide various adapters, connectors, channels, communication paths, etc., that provide for interaction with the subscriber data component 302 and the portability data component 304. It is to be appreciated that although the interface component 402 is incorporated into the data analysis component 306, such implementation is not so limited. For instance, the interface component 402 can be a stand-alone component to receive or transmit data in relation to the system 400. In particular, the interface component 402 can receive any data relating to a service provider (not shown) associated with the system 400. For instance, the interface component 402 can receive raw collected data and/or any data collected from the service provider.

The correlation component 404 can associate, aggregate, or otherwise determine relationships between data obtained by the data analysis component 306. For example, the correlation component 404 can determine the relationship between a set of line numbers disconnected within a predetermined time period, and locations (e.g., region, cluster, sub-cluster) associated with those line numbers. The resulting correlation can indicate the number of disconnects per location during the predetermined time period. Furthermore, the correlation component 404 can determine a relationship between the number of disconnects per location during the predetermined time period, and the percentage of subscribers in the location compared to the total number of subscribers.

In addition, the correlation component 404 can include a scale component 408 that can balance, adjust, or otherwise scale the data relationships produced by the correlation component 404 to facilitate consumption or display of the data relationships. Returning to the previous example, the correlation component 404 can determine a relationship between the numbers of disconnects per location during the predetermined time period, and the percentage of subscribers in the location compared to the total number of subscribers. The scale component 408 can set an index value (e.g., base value, par value, etc.) for the number of disconnects expected in the location based on the percentage of total subscribers in the location. For instance, if a location contains 20% of the provider's total subscribers, then the scale component 408 can set the index value for disconnects to be 20% of the total number of disconnects. The correlation component 404 can correlate the number of disconnects in the location with the index value from the scale component 408 to determine a degree to which a location is over-indexing (e.g., the number of disconnects is above the index value), under-indexing (e.g., the number of disconnects is below the index value), or indexing (e.g., within a predetermined range of the index value). Similarly, if the total number of Brand A Smartphones in the location comprise 2% of the total number of mobile devices, then the scale component 408 can set the index value for disconnects of Brand A Smartphones in the location to be 2% of the total number of disconnects.

The display component 406 can facilitate displaying the data relationships determined by the correlation component 404 as a heat map, a fractal map, a tree map, a three dimensional (3D) plot, a 3D map, a graph, a chart, and so forth. Continuing with the previous example, the correlation component 404 can determine the degree to which the number of disconnects in a location are over-indexing, under-indexing, or indexing. For instance, if the disconnects in the location are slightly over-indexing, the display component 406 can translate the data obtained from the correlation component into a heat map to be displayed via a cell phone, smart phone, tablet computer, laptop, desktop computer, television, projector, and so forth. Slightly over-indexing can be defined as a predetermined range above the index value, for example, between 0.1% to 1%, wherein the range of 0.1% to 1% is represented on the heat map by a first color, pattern, shade, texture, height, weight, etc. Moreover, additional degrees of over-indexing or under-indexing can be represented by different colors, patterns, shades, textures, etc. In this way, complex data relationships involving large quantities of data can be graphically represented, and can be more readily digested by a user/viewer. In addition, the display component 406 can facilitating displaying additional data, such as textual data, graphs, charts, etc. For instance, the display component 406 can display a set of key performance indicators (KPI) as textual data (discussed in greater detail below).

The system 400 can additionally include a memory (e.g., data storage or data store) 410 and a processor 412 that are operatively connected to the data analysis component 306. The memory 410 can store, save, or otherwise maintain the data analysis component 306, and/or virtually any components or data associated with the data analysis component 306. In addition, the processor 412 can execute instructions for, or related to, the data analysis component 306, and/or virtually any components included therein. It is to be appreciated that the data analysis component 306 can reside, execute, or otherwise operate in a computing device such as a cell phone, smart phone, tablet computer, laptop, desktop computer, internet enabled television or projector, and so forth. For example, the data analysis component 306 reside on a computing device, such as a tablet computer, and be associated or integrated with an application executed on the tablet computer. Additionally or alternatively, the data analysis component 306, or one or more of the components included therein, can execute on a server, in a cloud, or across a distributed communication networks, and communicate data via a network connection to an application residing on a computing device.

Figure 5:
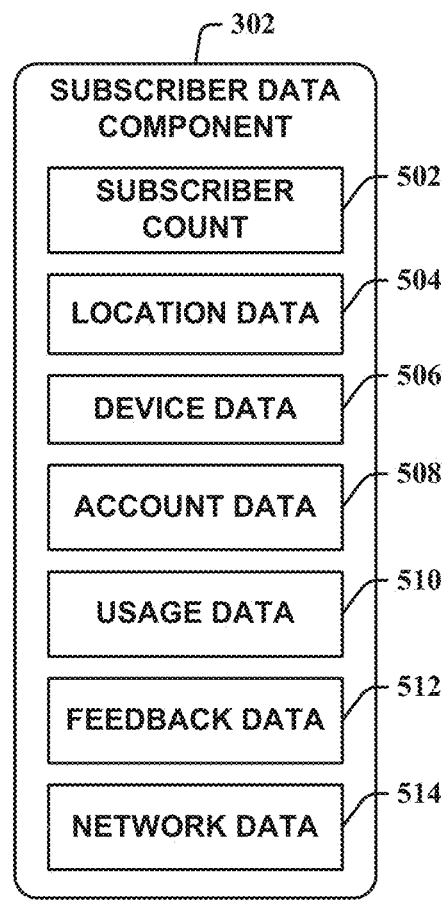
FIG. 5 illustrates an example subscriber data component in accordance with various aspects described herein.

FIG. 5 illustrates an example subscriber data component 302 in accordance with various aspects described herein. As discussed previously, the subscriber data component 302 can communicate subscriber data to the data analysis component 306 (See FIG. 4). The subscriber data can include, but is not limited to, subscriber count data 502, location data 504, device data 506, account data 508, usage data 510, feedback data 512, and network data 514. The subscriber count data 502 can include a total number of subscribers (e.g., total line numbers or CTN#), a number of new subscribers acquired within a predetermined time period (e.g., day, month, year, etc.), and/or a number of disconnected subscribers within a predetermined time period (e.g. churn). The location data can indicate a primary location (e.g., residence, location of subscription, etc.) of each subscriber, wherein the location can include a country, a region, a cluster, and/or a sub-cluster. For example, the primary location of a subscriber that resides in, and subscribed to the wireless communication services in, Cleveland, Ohio can be identified nationally as the United States, regionally as the Midwest, in a cluster comprised of Ohio, Michigan, and Indiana, and in a sub-cluster comprised of northeast Ohio. The level of granularity (e.g., geographic granularity level or geographic granularity) can be selected based on the desired data.

The device data 506 can include an identification of each of the device(s) associated with a particular subscriber. For example, the device data can indicate that the subscriber has a Brand A Smartphone, and a Brand B tablet associated with his line number. The account data 508 can include information about the status of a subscriber's account, such as the subscriber is within in the term of a contract (e.g., In Contract), the term of the contract has expired, service has been terminated voluntarily, service has been terminated involuntarily, etc. In addition, the account data 508 can include information about a subscriber's account type, such as individual account (e.g., Individual), group account (e.g., Group), consumer account (e.g., Consumer), corporate account (e.g., Corporate), and so forth. The usage data 510 can include information relating to an amount of services that a subscriber consumes or consumed. For example, the usage data 510 can indicate that the subscriber's monthly data usage is below 200 megabytes (MB), greater than 200 MB and less than 2 gigabytes (GB), or greater than 2 GB. The feedback data 512 can be data obtained from the user via a survey, customer service contact, or an application (e.g. 'Mark the Spot', etc.). For example, the feedback data 512 can be obtained from systems, devices, or methods, such as those disclosed in commonly owned, co-pending, U.S. patent application Ser. No. 12/775,384 ("the '384 application"), herein incorporated by reference. The network data 514 can include virtually any data relating to the performance or operation of the network. It is to be appreciated that subscriber data component 302 can be maintained by the service provider, for example, in a data store, on a server, or in a cloud. Additionally or alternatively, the subscriber data component 302 can be distributed across a communication network, or can be maintained by or in conjunction with a third party.

Figure 6:
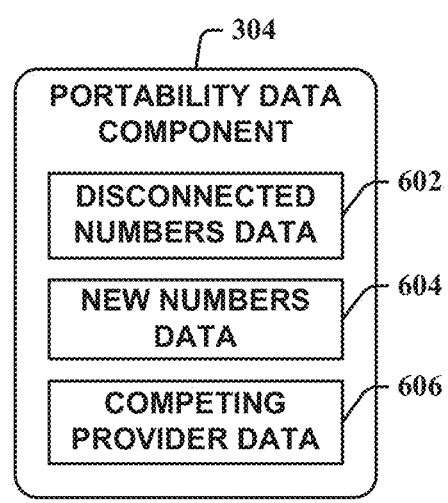
FIG. 6 illustrates an example portability data component in accordance with various aspects described herein.

Turning to FIG. 6, illustrated is an example portability data component 304 in accordance with various aspects described herein. As discussed previously, the portability data component 304 can communicate line number portability data to the data analysis component 306 (See FIG. 4). The line number portability data can include, but is not limited to, disconnected numbers data 602, new numbers data 604, and competing provider data 606. The disconnected numbers data 602 can detail line numbers that have been ported over to another carrier within a predetermined period of time (e.g., day, month, year, etc). The new numbers data 604 can detail line numbers that have been ported to the provider from another provider (e.g., competing provider) within a predetermined period of time. The competing provider data 606 can detail which providers the line numbers in the disconnected numbers data 602 have been ported to, or the providers that line numbers in the new numbers data 604 have been ported from. It is to be appreciated that portability data component 304 can be maintained by the service provider, for example, in a data store, on a server, in a cloud, and so forth. Additionally or alternatively, the portability data component 304 can be distributed across a communications network, or can be maintained by or in conjunction with a third party.

Figure 7:
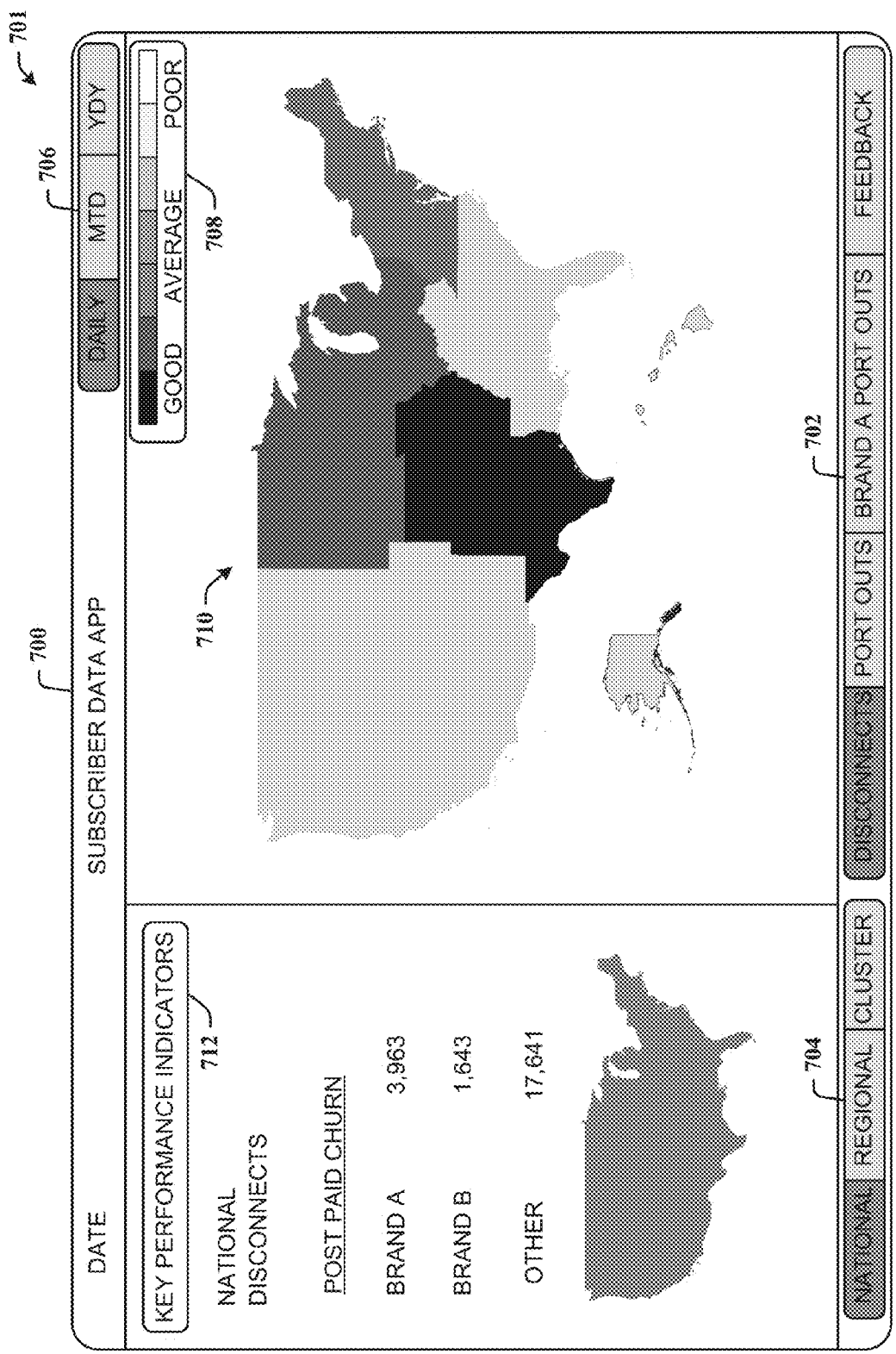
FIGS. 7-8 illustrate example screenshots of a subscriber data analysis application in accordance with various aspects described herein.

Turning to FIG. 7, illustrated is an example screenshot 700 of a subscriber data application 701 in accordance with various aspects described herein. As discussed previously (See FIG. 4), a data analysis component 306 can reside, execute, or otherwise operate in a computing device such as a cell phone, smart phone, tablet computer, laptop, desktop computer, internet enabled television or projector, and so forth. For example, the data analysis component 306 can reside on a computing device, such as a tablet computer, and be associated, or integrated, with an application executed on the tablet computer. Additionally or alternatively, the data analysis component 306, or one or more of the components included therein, can execute in a server, in a cloud, or across a distributed communication networks, and communicate data via a network connection to an application residing on a computing device.

The subscriber data application 701 can display determined data relationships (e.g., analysis data, etc.), for example, those determined by the data analysis component 306, and can enable a user to select, manipulate, or otherwise interact with the data relationships. A data type 702 selection menu enables a user to determine a data type to be displayed by the subscriber data application 701. For example, the user can select from data detailing line number disconnects (e.g., disconnects), line number port outs (e.g., port outs), port outs of line numbers using a particular model of mobile device, such as a Brand A Smartphone (e.g., Brand A Port Outs), or feedback data from subscribers (e.g., reported network problems, customer satisfaction, etc).

Figure 11:
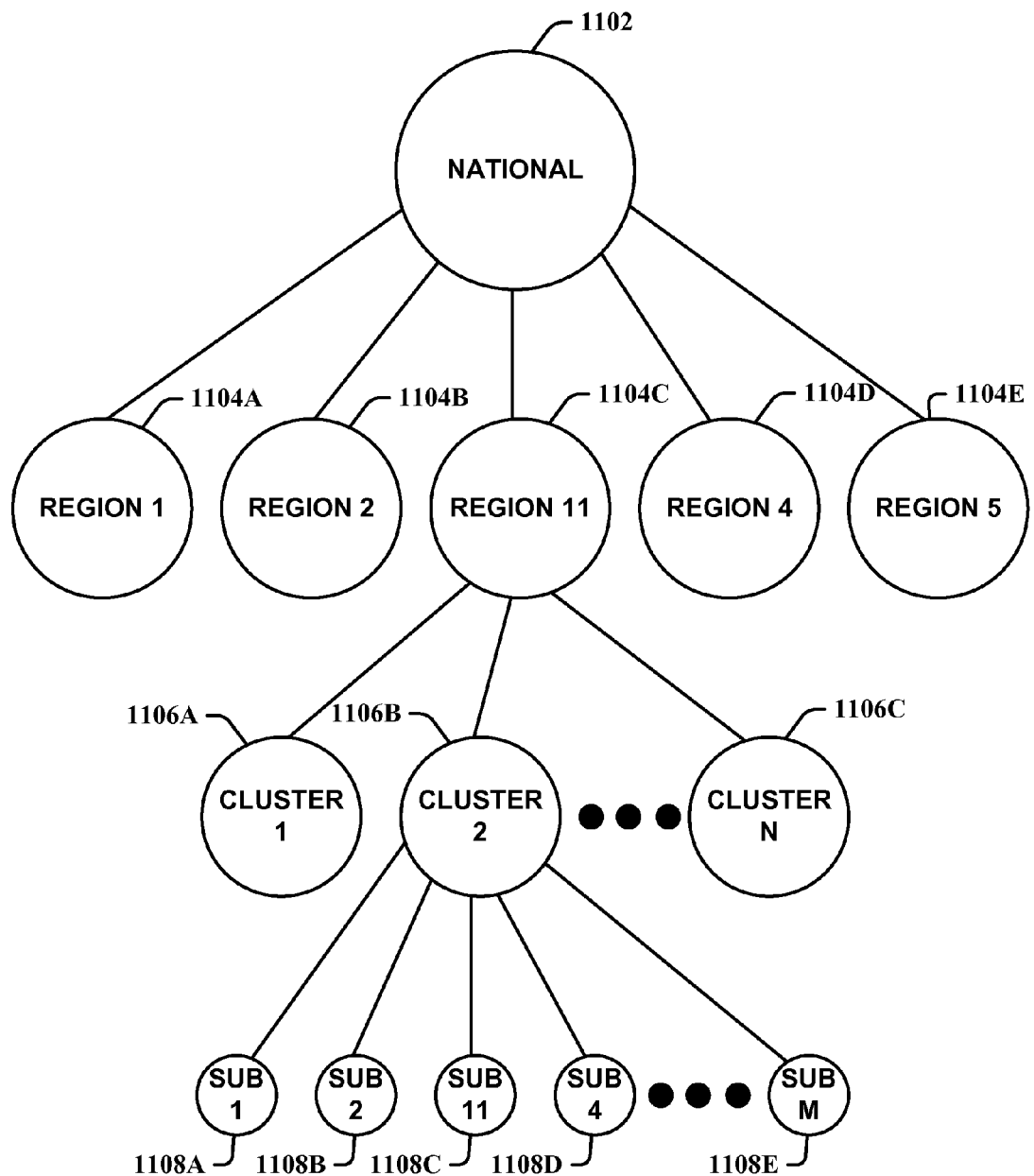
FIG. 11 illustrates an example geographical granularity hierarchy in accordance with various aspects described herein.

A geographic granularity 704 selection menu enables users to select a level of geographic granularity with which to display the data type (See FIG. 11). For instance, the geographic granularity 704 selection menu can include a plurality of options, such as a national level (e.g., national), a regional level (e.g., regional), a sub-regional or cluster level (e.g., cluster), and a sub-cluster level (e.g., sub-cluster). For instance, the national level can be the United States of America, wherein the national level is divided into five regions, such as a West, a Southwest, a Midwest, a Southeast, and an Northeast region. Each region can be divided into a plurality of clusters, for example, the Midwest region can contain a cluster comprised of Ohio, Michigan and Indiana. In addition, each cluster can be divided into a plurality of sub-clusters, for example, the Ohio, Michigan and Indiana cluster can contain a sub-cluster comprised of northeast Ohio.

A time period 706 selection menu enables the user to determine a time period for data aggregation. For example, the time period 706 selection menu can include options consisting of daily, month-to-date (e.g., MTD), and year-to-date (e.g., YTD), wherein the daily option can be used to display the number of disconnects nationally for one day (e.g., today). In addition, the subscriber data application 701 can include a scale 708 that facilitates rendering the data type 702 selected as a heat map 710. As discussed previously, an index value (e.g., average) for the selected data type 702 can be determined, and the scale 708 can be based on the index value. For example, if the selected data type 702 is set to disconnects, and the geographic granularity 704 is set to national, then the index value can be determined based on the total number of subscribers in a region compared to the total number of national subscribers. For instance, if a region contains 20% of the provider's total number of subscribers, then the index value for disconnects in that region can be set to 20% of the total number of disconnects in the nation. The data type selected 702 will be displayed on the heat map 710 with the geographic granularity 704 selected based on the scale 708. For example, a user can view the heat map 710, and readily determine based on the color of the Southeast region that it is over-indexing, because the color on the scale 708 is associated with a number of disconnects greater than the index value of the Southeast region. Similarly, a user can quickly appreciate based on the color of the Southwest region that it is significantly under-indexing, because the color on the scale 708 is associated with a number of disconnects significantly less than the index value of the Southwest region. It is to be appreciated that the subscriber data application 701 is not limited to the heat map 710, and can employ additional graphical illustration techniques, such as fractal map, tree map, graphs, three-dimensional (3D) plots, a 3D map, a graph, a chart, and so forth. In addition, data displayed can be represented using virtually any color, pattern, shade, texture, etc.

The subscriber data application 701 can display a set of additional relevant data (e.g., key performance indicators) 712. The key performance indicators 712 displayed can be dynamically determined based on the data type 702, the geographic granularity 704, the time period 706, the scale 708, and/or the heat map 710. For example, the subscriber data application 701 can determine that data regarding churn of specific model devices (e.g., Brand A, Brand B, etc.) should be displayed when the data type 702 is set to disconnects, and the geographic granularity 704 is set to national. Additionally or alternatively, the key performance indicators 712 displayed can be determined based on a set of predetermined criteria or preferences. For example, the user can determine a set of default key performance indicators 712 to be shown, unless otherwise determined. It is to be appreciated that the foregoing contains a few examples for brevity and simplicity of explanation; however, the subscriber data application 701 can be implemented in a plurality of ways within the scope of the subject innovation. Furthermore, it is to be appreciated that the subject innovation is not limited to wireless communication systems, and can apply to virtually any customer/subscriber system, for example, cable providers, internet service providers, social networking websites, and so forth.

Figure 8:
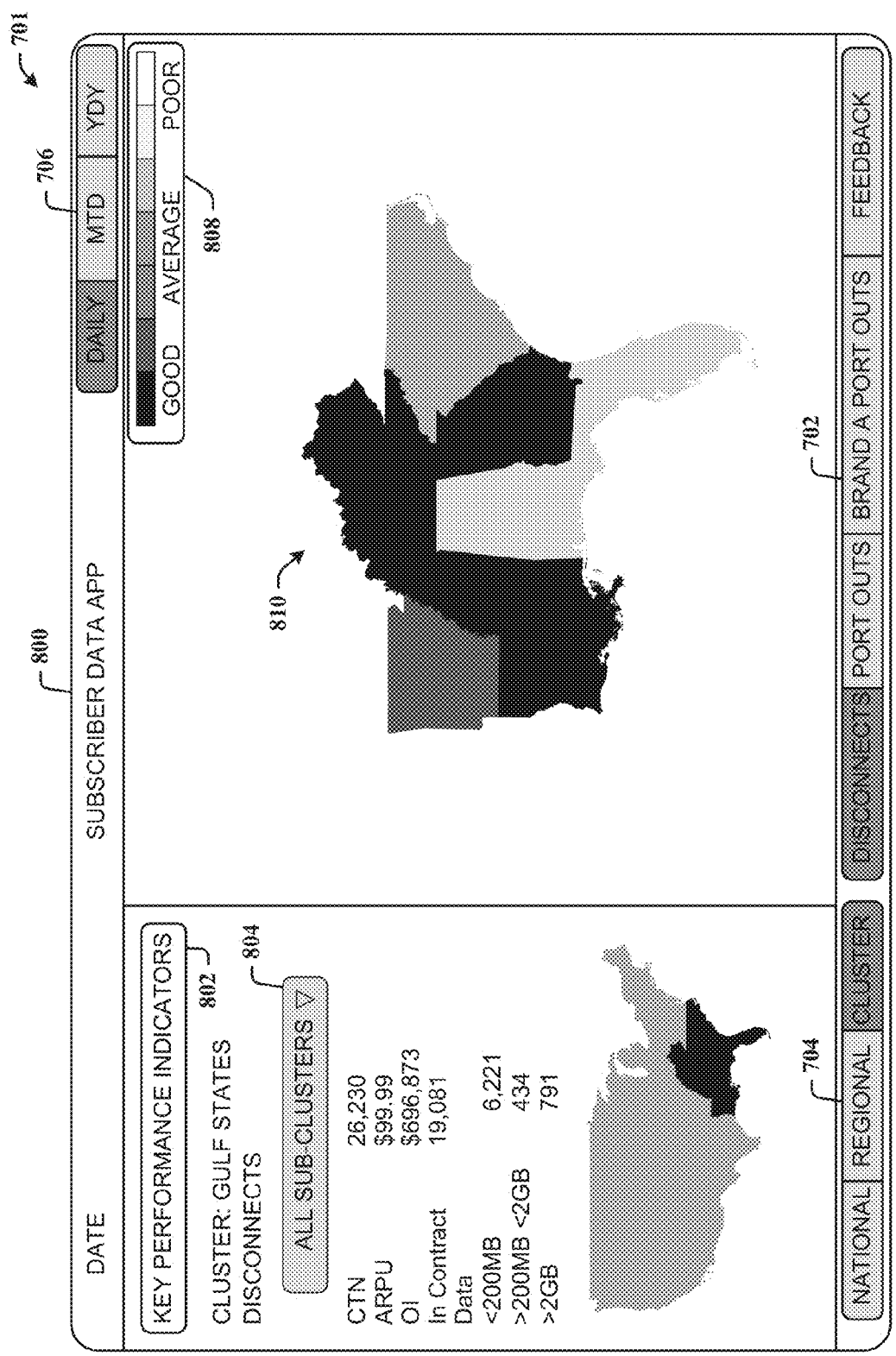

FIG. 8 illustrates an example screenshot 800 of the subscriber data application 701 in accordance with various aspects described herein. The screenshot 800 includes a heat map 810 displaying disconnects (e.g., the data type 702 is set to disconnects), in a cluster (e.g., the geographic granularity 704 is set cluster) comprised of a set of Gulf States for a given day (e.g., the time period 706 is set to daily). As discussed previously, the heat map 810 illustrates the disconnects as a function of a scale 808, where the scale 808 has an index value based on the percentage of subscribers in the cluster, or sub-clusters, compared to the percentage of total subscribers.

In addition, the subscriber data application 701 can display a set of additional relevant data (e.g., key performance indicators) 802. As discussed previously, the key performance indicators 802 displayed can be dynamically determined based on the data type 702, the geographic granularity 704, the time period 706, the scale 708, and/or the heat map 810. For example, a drop-down sub-clusters menu 804 can be displayed, because the geographic granularity 704 is set to clusters. Thus, enabling the user to select various sub-clusters included in the cluster. It is to be appreciated that the foregoing contains a few examples for brevity and simplicity of explanation; however, the subscriber data application 701 can be implemented in a plurality of ways within the scope of the subject innovation.

Figure 9:
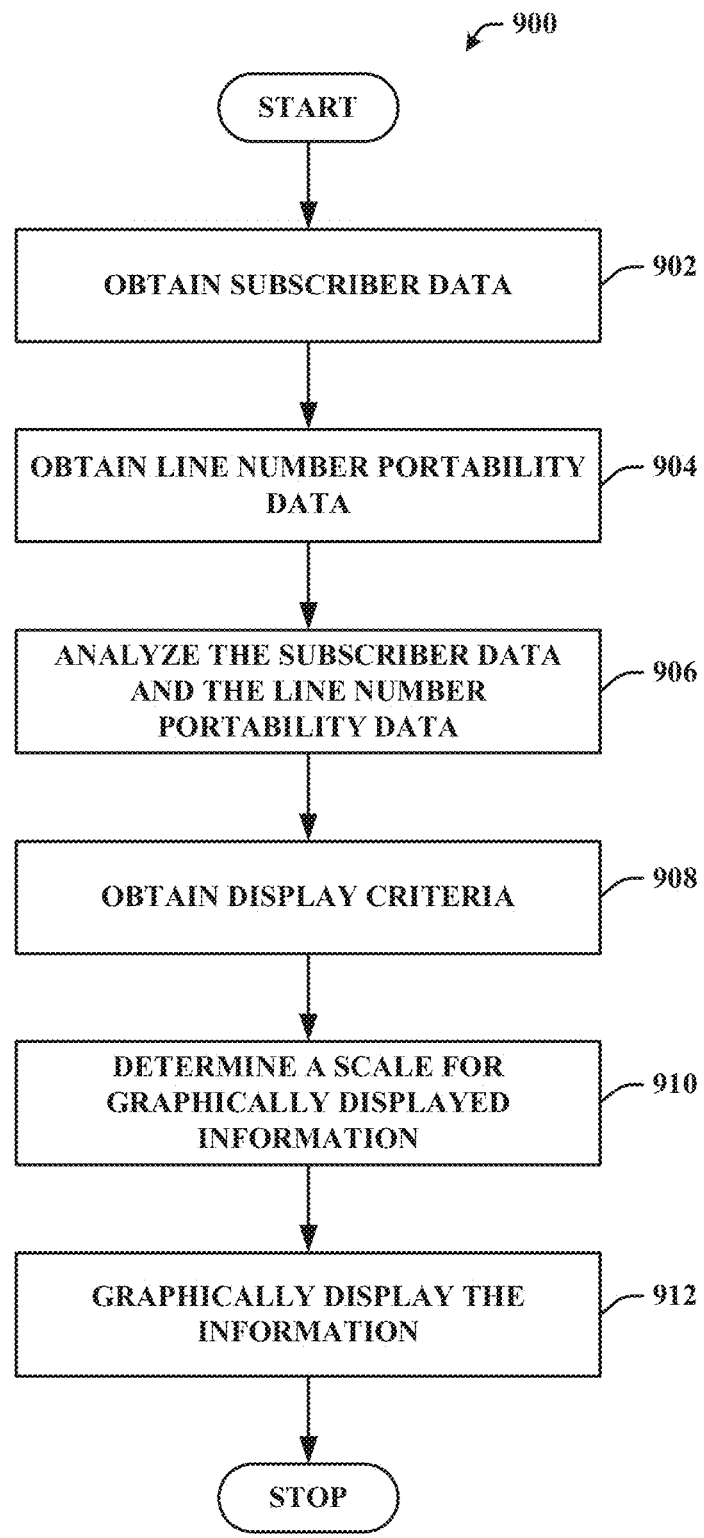
FIGS. 9-10 are flow diagrams of respective methods for subscriber data analysis in accordance with various aspects described herein.
Figure 10:
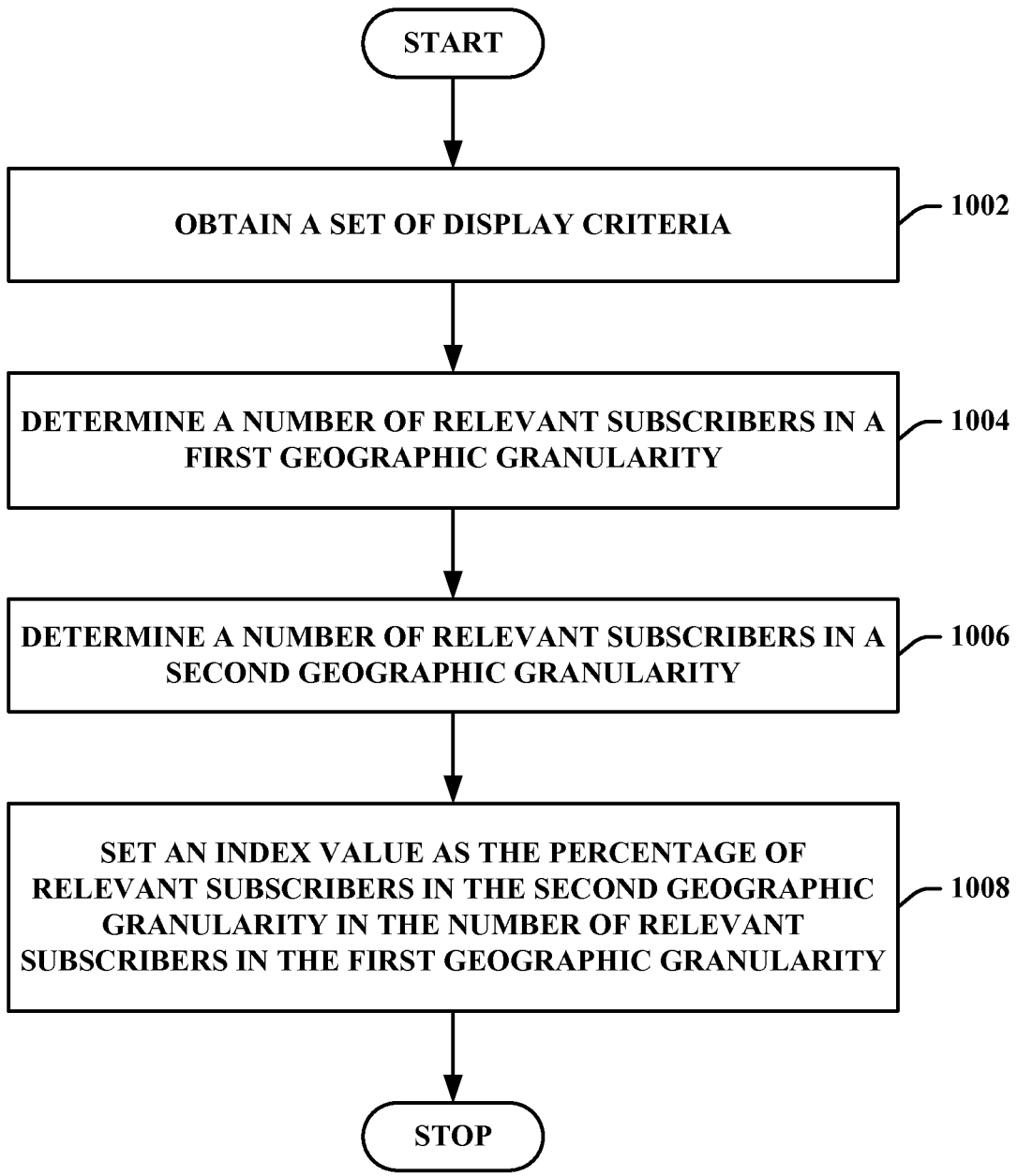

In view of the example systems described supra, methods that may be implemented in accordance with the disclosed subject matter may be better appreciated with reference to the flow charts of FIGS. 9-10. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 9, is an example methodology 900 for analyzing and graphically rendering subscriber data in accordance various aspects described herein. At 902, subscriber data can be obtained. For example, the subscriber data can be obtained via a network connection from a communications provider, and can include, but is not limited to, subscriber count data, location data, device data, account data, usage data, feedback data, and network data (See FIG. 5). At 904, line number portability data can be obtained. As discussed previously, the line number portability data can include disconnected numbers data, new numbers data, competing provider data, and so forth (See FIG. 6). At 906, the subscriber data can be analyzed to determine data relationships. For instance, the subscriber count data can be correlated with the location data to determine the number of subscribers in each location (e.g., region, cluster, sub-cluster, etc.). Additionally, the subscriber data can be correlated with the line number portability data. As an additional example, the device data, disconnected numbers data, location data, and competing provider data can be correlated to determine the disconnections of a particular device in favor a competing provider by location. As yet another example, subscriber count data can be correlated with feedback data to obtain a data relationship between subscriber feedback and disconnects. Virtually any combination of subscriber data and line number portability data can be correlated to determine data relationships.

At 908, a set of display criteria can be obtained. The display criteria can include data and/or data relationships (e.g., information) to be displayed, and can be determined by a user or a set of predetermined preferences. Returning to a previous example, a user can determine that the information regarding a quantity of disconnected line numbers by location should be displayed. At 910, a scale for graphically displaying the desired information can be determined (See FIG. 10). At 912, the information can be graphically displayed in a plurality of ways, including but not limited to, via a heat map, a fractal map, a tree map, a three dimensional (3D) plot, a 3D map, a graph, a chart, and so forth, based on the scale determined at 910.

FIG. 10 illustrates an example methodology for determining a scale for graphically rendering subscriber data in accordance various aspects described herein. At 1002, a set of display criteria can be obtained, as previously discussed. The display criteria can include data and/or data relationships (e.g., information, analysis data,) to be displayed, and can be determined by a user or a set of predetermined preferences. For example, a user can determine that information regarding a quantity of disconnected line numbers, having an associated Brand A Smartphone, is to be displayed by region. At 1004, a quantity of relevant subscribers in a first geographic granularity can be determined based on the subscriber data. The first geographic granularity can be a geographic granularity that is higher on a geographic granularity hierarchy than, and related to, a second geographic granularity (See FIG. 11). Returning to the previous example, the relevant subscribers are those subscribers using a Brand A Smartphone, and the first geographic granularity can be a nation (e.g., the United States). In other words, the number of relevant subscribers in the first geographic granularity is all subscribers having a Brand A Smartphone in the United States. At 1006, a quantity of relevant subscribers at a second geographic granularity can be determined based on the subscriber data. Returning again to the previous example, the relevant subscribers are those subscribers using a Brand A Smartphone, and the first geographic granularity can be a region (e.g., West, Southwest, Midwest, Southeast, Northeast), because the user has requested the information to be displayed by region. In other words, if the region requested is the Midwest, then the number of relevant subscribers in the second geographic granularity is all subscribers having a Brand A Smartphone in the Midwest. At 1008, an index value is set as a percentage of the relevant subscribers in the second geographic granularity compared to the number of relevant subscribers in the first geographic granularity. Returning yet again to the previous example, if 300,000 people in the Midwest have Brand A Smartphones, and 4,000,000 people in the United States have Brand A Smartphones, then the index value is set to 7.5%, because the Midwest accounts for 7.5% of the total Brand A Smartphones in the United States. As discussed previously, the index value can be used to facilitate graphically displaying the information. For example, if the index value is 7.5% in the previous example, then the Midwest should account for 7.5% of all the disconnected users having a Brand A Smartphone. Information regarding a quantity of disconnected line numbers having an associated Brand A Smartphone for the Midwest can be displayed via a heat map by comparing the quantity to the index value, and assigning various colors, patterns, shades, textures, heights, weights, etc. to a set of thresholds corresponding to predetermined ranges of difference between the quantity and the index value (See FIGS. 7 and 8).

FIG. 11 illustrates an example geographical granularity hierarchy in accordance with aspects described herein. At a first level there is a national granularity 1102. For example, the national granularity 1102 can be a country, such as the United States. Below the first level, the national granularity 1102 can be divided into a plurality of regions 1104. For example, the United States can be divided into five regions 1104A-1104E, such as the West, Southwest, Midwest, Southeast, and Northeast. It is to be appreciated that foregoing is an example, and there can be virtually any number of regions 1104. Below the regional level 1104, each region can be divided into N clusters 1106, where N is an integer. Additionally, below the cluster level, each cluster 1106A, 1106B, 1106C can be divided into M sub-clusters 1108A, 1108B, 1108C, 1108D, 1108E, where M is an integer. The geographical granularity hierarchy facilitates displaying graphically displaying subscriber data and data relationships, as discussed previously. It is to be appreciated that the foregoing is just a few examples, and additional levels of geographical granularity can be provided. For example, a continental or global level could be provided above the national level 1102, and/or sub-sub-clusters could be provided below the sub-cluster level 1108.

Figure 12:
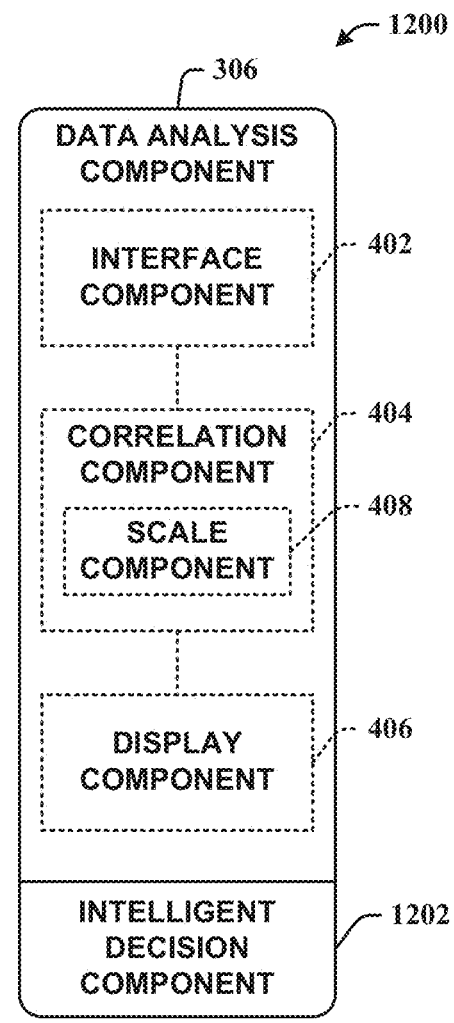
FIG. 12 illustrates an example block diagram of a system that employs an intelligent decision component which facilitates automating one or more features in accordance with aspects described herein.

FIG. 12. illustrates a system 1200 that employs an intelligent decision component 1202 which facilitates automating one or more features in accordance with aspects described herein. The subject innovation (e.g., in connection with inferring) can employ various decision facilitating schemes for carrying out various aspects thereof. For example, processes for data correlation, scale determination and/or graphical rendering can be facilitated via an automatic classifier system and process.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions there from. For instance, by observing that one user interacts with a subset of other users over a network, it may be determined or inferred that this subset of users belongs to a desired social network of interest for the one user as opposed to a plurality of other users who are never or rarely interacted with.

Figure 13:
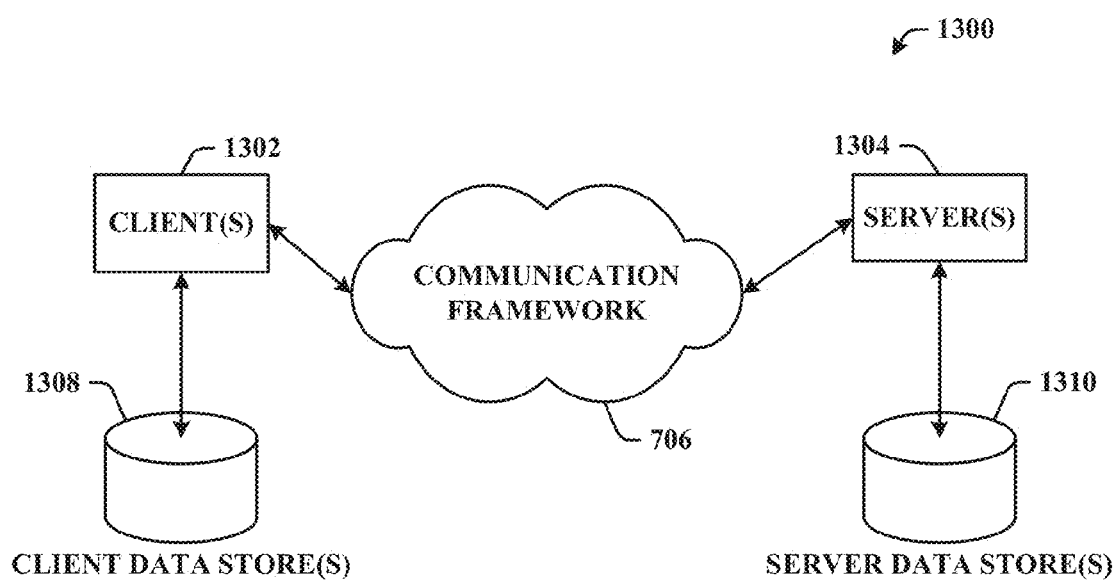
FIG. 13 illustrates a schematic block diagram of an exemplary computing environment in accordance with various aspects described herein.

Referring now to FIG. 13, there is illustrated a schematic block diagram of an exemplary computing environment 1300 in accordance with various aspects described herein. The system 1300 includes one or more client(s) 1302. The client(s) 1302 can be hardware and/or software (e.g., threads, processes, computing devices). The client(s) 1302 can house cookie(s) and/or associated contextual information by employing the invention, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

Figure 14:
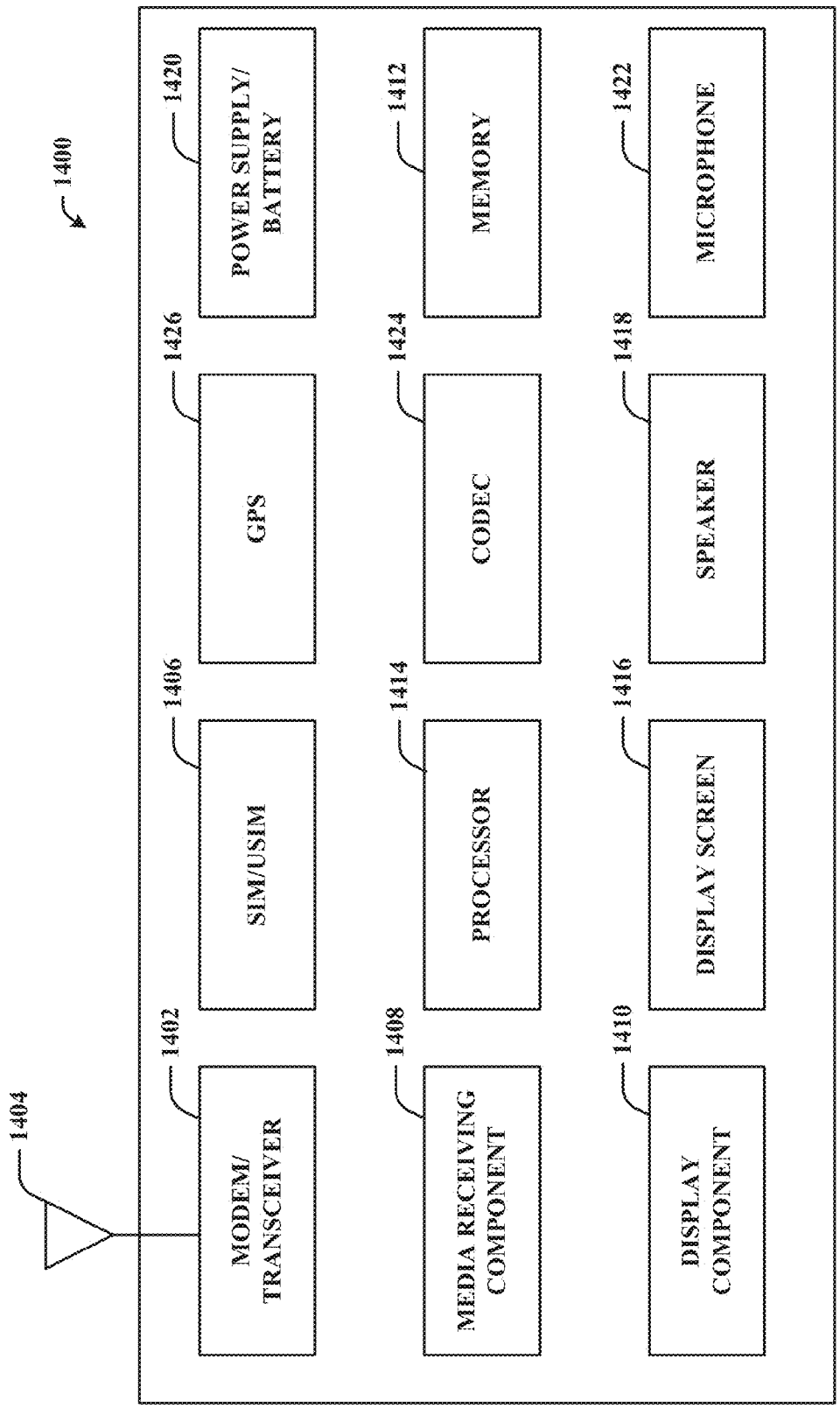
FIGS. 14-17 illustrate example systems that can be employed with various aspects described herein.

FIG. 14 illustrates an additional or alternative example aspect of a wireless system that can implement features and aspects described herein and operated in accordance with such features and aspects. The example system 1400 can include a modem 1402 that can wirelessly communicate with a wide area network, for example, employing a 2G/3G/3.5G/4G wireless connection. As an example, the modem 1402 can be a wireless wide area network (WWAN) modem/transceiver such as a GPRS/EDGE/CDMA/UMTS/HSPA/LTE modem that can transfer digital images (or other media files) and/or control data. Moreover, the modem 1402 can operate in any of the commonly used wireless spectrum bands. As an example, the modem 1402 can be IPv6 (Internet Protocol version 6) enabled. It can be appreciated that the modem 1402 can be embedded in the system 1400 or external to the system and can be connected to an antenna 1404 to receive and/or transmit data. The antenna 1404 can be external or internal. Moreover, the modem 1402 can receive instructions sent by a remote user (e.g. system subscriber) over a network, e.g., a mobile network platform that serves a network of deployed access points, to change one or more settings and/or perform one or more functions on the example system 1400, for example, load, delete or play a file.

Furthermore, the modem 1402 can also be configured to receive wireless alerts (SMS, Image)/broadcast from a mobile network platform. Additionally, the example system 1400 of a can include a SIM (Subscriber Identity Module) or USIM (Universal Subscriber Identity Module) 1406 associated with the system users account subscription. The SIM or USIM 1406 can be prepaid, flat rate monthly, or usage based. Further, the SIM or USIM 1406 may need to be a locked to the specific type of device (e.g., a wireless digital media that employs a WWAN modem) to prevent it from being used in a mobile phone or wireless data device to prevent network abuse if lower rates, including flat rate, are offered to the system subscribers.

A media receiving component 1408 can receive media files, e.g., content(s), sent to the example system 1400 through an access point via the modem 1402. Received media files can be displayed through display component 1410. The modem 1402 can include control functions to enable communication with the WWAN and transfer of data in the downlink. The modem 1402 can be downlink enabled and can optionally allow the ability to transfer data in the uplink (UL) direction beyond control channels. For example, the system 1400 can transfer data associated with available free space in memory 1412 to a mobile network platform in the UL. Further, the modem 1402 can be configured to allow network control such that transfer of data could occur at various times of the day based on network/sector loading due to traffic and propagation conditions and/or based on user preferences. Further, the modem 1402 can be configured to work on a prepaid condition or active account or unlimited usage account.

The system 1400 can typically include a processor 1414 that can be a processor based controller chip. Specifically, the processor 1414 can be a processor dedicated to analyzing information received by modem 1402 and/or generating information for transmission on the UL, a processor that controls one or more components of the system 1400, a processor that facilitates output of media files on a display screen 1416 or via speaker 1418, and/or a processor that both analyzes information received by modem 1402, generates information for transmission on the UL, controls one or more components of the system 1400 and facilitates output of media files on a display screen 1416 or via speaker 1418.

The system 1400 can additionally comprise memory 1412 that is operatively coupled to processor 1414 and that can store data to be transmitted, received data, data associated with analyzed signal and/or interference strength, information related to an assigned channel, power, rate, or the like, and any other suitable information for estimating a channel and communicating via the channel. Memory 1412 can additionally store media files received from a sender over a network. Further, memory 1412 can also store user preferences and/or predefined user settings. In one example, memory 1412 can be partitioned, such that locally downloaded media files (e.g. downloaded by an end user) are stored in one partition and remotely downloaded media files (e.g., content(s) are stored in another partition. A number of program modules can be stored in the memory 1412, including an operating system, one or more application programs, other program modules and/or program data. It is appreciated that the aspects described herein can be implemented with various commercially available operating systems or combinations of operating systems.

Additionally, a system bus (not shown) can be employed to couple system components including, but not limited to, the system memory 1412 to the processor 1414. The system bus can be any of several types of bus structure that may further interconnect to a memory bus (with or without a memory controller), a peripheral bus, and a local bus using any of a variety of commercially available bus architectures.

The media files received from the mobile wireless network can be displayed on the display screen 1416 and/or audio files can be played via the speaker 1418. It can be appreciated that the media files stored in the memory 1412 can also be received via ports such as, but not limited to, USB, USB2, 1495, SD card, Compact Flash, etc. Additionally, system 1400 can include a power supply/battery 1420 that can be employed to power the system. As an example, power management techniques can be employed to save battery power, such that the battery can last longer between recharge cycles.

An end user can enter commands and information through one or more wired/wireless input devices, e.g., a keyboard, a pointing device, such as a mouse and/or a touch screen display 1416. A microphone 1422 can also be employed to enter data. For example, the end user can employ the microphone 1422 to enter an audio clip associated with an image. These and other input devices are often connected to the processor 1414 through an input device interface (not shown) that is coupled to a system bus, but can be connected by other interfaces, such as a parallel port, an IEEE 1394 serial port, a game port, a USB port, an IR interface, and so forth.

The system 1400 can further include a codec 1424 that can be employed encode and/or decode digital data. The codec 1424 can employ most any compression and/or decompression algorithm to compress/decompress a received media file. Furthermore, the system 1400 can include a GPS (global positioning system) 1426 that can be employed to determine the current geographical coordinates of the example the system 1400. The GPS 1426 can include a separate GPS antenna (not shown) or employ the antenna 1404 to communicate with a GPS satellite. In one example, the example system 1400 can receive broadcast warnings, emergency alerts, weather alerts, etc. based on the current coordinates.

In addition, the example system 1400 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag, and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 15:
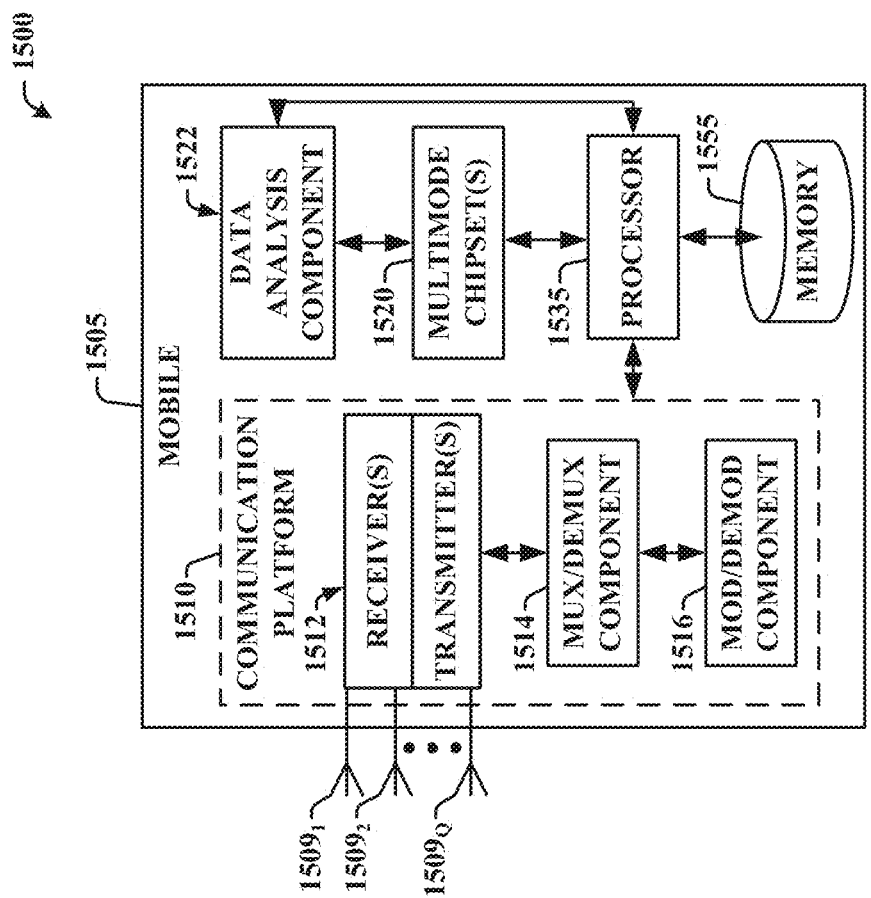
Figure 16:
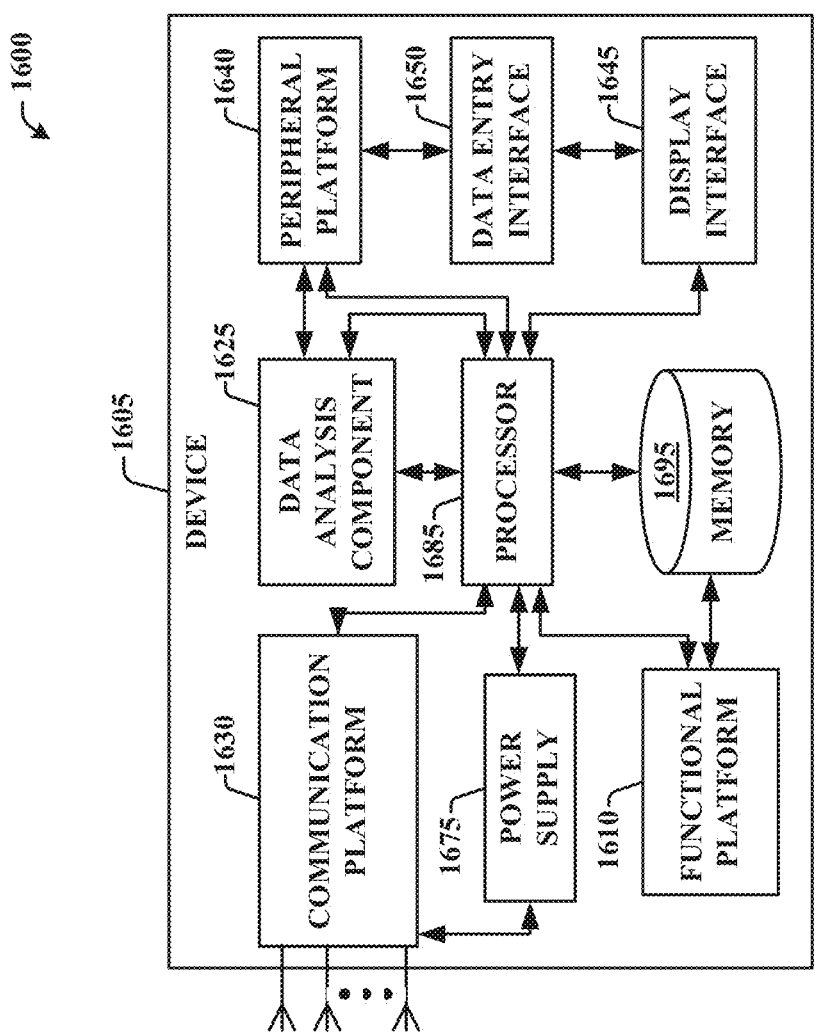
Figure 17:
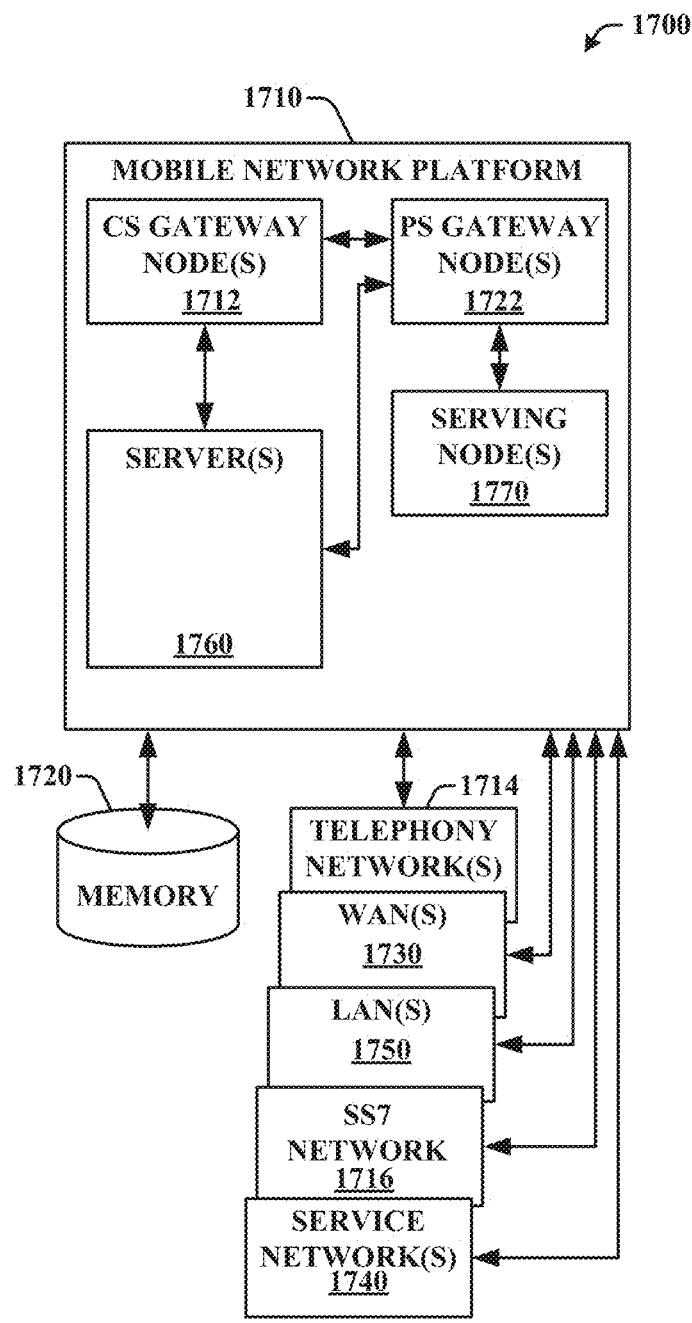

To provide further context for various aspects described herein, FIG. 15 illustrates a non-limiting example block diagram of a system 1400 of a mobile 1405 that can deliver content(s) or signaling directed to a device in accordance with aspects described herein. Additionally, FIG. 16 illustrates a non-limiting example block diagram of a system 1500 of a non-mobile device 1505, which can be provisioned through a non-mobile network platform and can be employed to convey content(s) or signaling to a device in accordance with aspects described herein. Furthermore, FIG. 17 illustrates a non-limiting example block diagram of a system 1600 of a mobile network platform 1610 which can provide subscriber data in accordance with aspects described herein.

In the mobile 1505 of FIG. 15, which can be a multimode access terminal, a set of antennas $1509_1$-$1509_Q$ (Q is a positive integer) can receive and transmit signal(s) from and to wireless devices like access points, access terminals, wireless ports and routers, and so forth that operate in a radio access network. It should be appreciated that antennas $1509_1$-$1509_Q$ are a part of communication platform 1510, which comprises electronic components and associated circuitry that provide for processing and manipulation of received signal(s) and signal(s) to be transmitted; e.g., receivers and transmitters 1512, mux/demux component 1514, and mod/demod component 1516.

In the system 1500, multimode operation chipset(s) 1520 allows mobile 1505 to operate in multiple communication modes in accordance with disparate technical specification for wireless technologies. In an aspect, multimode operation chipset(s) 1520 utilizes communication platform 1510 in accordance with a specific mode of operation (e.g., voice, Global Positioning System (GPS)). In another aspect, multimode operation chipset(s) 1520 can be scheduled to operate concurrently (e.g., when Q>1) in various modes or within a multitask paradigm.

Mobile 1505 includes data analysis component 1522 and can convey content(s) or signaling in accordance with aspects described herein. It should be appreciated that data analysis component 1522, can include a display interface that renders content in accordance with aspects of an user prompt component (not shown) that resides within data analysis component 1522.

Mobile 1505 also includes a processor 1535 configured to confer functionality, at least in part, to substantially any electronic component within mobile 1505, in accordance with aspects described herein. As an example, processor 1535 can be configured to execute, at least in part, instructions in multimode operation chipset(s) that afford multimode communication through mobile 1505 such as concurrent or multitask operations of two or more chipset(s). As another example, processor 1535 can facilitate mobile 1505 to receive and convey signaling and content(s) (e.g., various data flows) that are part of an active management act initiated by a subscriber that operates mobile 1505, or an approval cycle associated with auxiliary subscribers (e.g., secondary subscriber, tertiary subscriber . . . ). Moreover, processor 1535 facilitates mobile 1505 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 1555 can store data structures (e.g., metadata); code structure(s) (e.g., modules, objects, classes, procedures) or instructions; network or device information like policies and specifications, attachment protocols; code sequences for scrambling, spreading and pilot (e.g., reference signal(s)) transmission; frequency offsets, cell IDs, and so on.

In the system 1500, processor 1535 is functionally coupled (e.g., through a memory bus) to memory 1555 in order to store and retrieve information necessary to operate and/or confer functionality, at least in part, to communication platform 1510, multimode operation chipset(s) 1520, data analysis component 1522, and substantially any other operational aspects of multimode mobile 1505.

FIG. 16 is a block diagram of an example system 1600 of a non-mobile device that can convey content(s) exploit various aspects of content transaction(s) as described herein. Device 1605 includes a functional platform 1610 that comprises a set of components (not shown) that provide, at least in part, one or more specific functionalities of the non-mobile device 1605. Additionally, non-mobile device 1605 includes a data analysis component 1625 that operates in accordance with aspects described herein before. Moreover, in an aspect, non-mobile device 1605 can include a communication platform 1630 that can provide wireless communication capabilities in addition, or alternatively, to connectivity of non-mobile device 1605 through wired links (e.g., Ethernet, USB, GPIB, RS-232, FireWire, optical or coaxial cable connection to a network interface such as network interface, or router (not shown)). With respect to wireless capability, in non-mobile device 1605, which can be a multimode access terminal, a set of antennas $1637_1$-$1637_P$ (P is a positive integer) can receive and transmit signal(s) from and to wireless devices like access points, access terminals, wireless ports and routers, etc., that operate in a radio access network. Communication platform 1630 can exploit the set of P antennas $1637_1$-$1637_K$, (K is a positive integer) to establish communication within various modes such as single-input single-output, or multiple-input multiple output.

Additionally, in non-mobile device 1605, a peripheral platform 1640 can include, or facilitate connection to, additional devices such as printer(s), media player(s), wireless router(s) (e.g., network interface), biometrics touch-pad(s), etc. In an aspect, to afford such connectivity, peripheral platform 1640 can include jacks for one or more of Ethernet, USB, GPIB, RS-232, FireWire, optical or coaxial cable connectors. Additionally, display interface 1645 can be a part of functional platform 1610 (e.g., when non-mobile device 1605 is a PC, an IPTV interface, a mobile, a back projector component, a data projector . . . ). In an aspect, display interface 1645 can be a liquid crystal display (LCD), a plasma panel, a monolithic thin-film based electro-chromic display, and so on. It should be appreciated that rendering areas in display interface 1645 can be substantially disparate.

It should be appreciated that non-mobile device 1605 also can include a data entry interface 1650 that can allow an end user to perform at least one of (i) command non-mobile device via configuration of functional platform 1610, (ii) deliver content(s) or signaling directed in accordance to aspects described herein, or (iii) generate content(s) (e.g., images via a built-in camera) or directive(s) for subscribed content.

Power supply 1675 can power-up device 1605 and substantially any component included thereon. It should be appreciated that alternative or additional embodiments of device 1605 may not include power supply 1675 and be powered via an attachment to a conventional power grid.

In the system 1600, non-mobile device 1605 includes processor 1685 which can be functionally coupled (e.g., through a memory bus) to memory 1695 in order to store and retrieve information to operate and/or confer functionality, at least in part, to data analysis component 1625, and substantially any component(s) thereon in accordance with aspects described herein; functional platform 1610; communication platform 1630 and substantially any other component of non-mobile device 1605. With respect to data analysis component 1625, and components thereon, processor 1685 can be configured to execute access protocols to convey credentials and gains access to a content management service to convey multimedia content(s) or signaling to a subscribed WDMF. In addition, in connection with communication platform 1630, processor 1685 is configured to confer functionality, at least in part, to substantially any electronic component within communication platform 1630. Moreover, processor 1685 facilitates communication platform 1630 to process traffic and control data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Memory 1695 also can retain multimedia content(s) or security credentials (e.g., passwords, encryption keys, digital certificates) that facilitate access to a content management service. In addition, memory 1695 can store data structures (e.g., metadata); code structure(s) (e.g., modules, objects, classes, procedures) or instructions, or substantially any type of software or firmware that processor 1685 can execute to provide functionality associated with functional platform 1610; network or device information like policies and specifications; code sequences for scrambling, spreading and pilot (e.g., reference signal(s)) transmission; and so on.

FIG. 17 illustrates a block diagram 1700 of a mobile network platform 1710 which can provide data analysis in accordance with aspects described herein. Generally, mobile network platform 1710 can include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect, as described above, component within PS domain of network platform 1710 can be employed to effect communication in accordance with aspects described herein.

With respect to CS communication, mobile network platform 1710 includes CS gateway node(s) 1712 which can interface CS traffic received from legacy networks such as telephony network(s) 1714 (e.g., public switched telephone network (PSTN), or public land mobile network (PLMN)) or a SS7 network 1716. Circuit switched gateway node(s) 1712 can authorize and authenticate traffic (e.g., voice) arising from such networks. Additionally, CS gateway node(s) 1712 can access mobility, or roaming, data generated through SS7 network 1716; for instance, mobility data stored in a visitation location register (VLR), which can reside in memory 1720. Moreover, CS gateway node(s) 1712 interfaces CS-based traffic and signaling and gateway node(s) 1722. As an example, in a 3GPP UMTS network, CS gateway node(s) 1712 can be embodied, at least in part, in gateway GPRS support node(s) (GGSN).

In addition to receiving and processing CS-switched traffic (e.g., content(s) that can be part of a content(s)

transmitted by a service provider) and signaling, PS gateway node(s) 1722 can authorize and authenticate PS-based data sessions with served mobile devices, non-mobile devices, and access points. Data sessions can include traffic, or content(s), exchange with networks external to the mobile network platform 1710, such as wide area network(s) (WANs) 1730 or service network(s) 1740; it should be appreciated that local area network(s) (LANs) 1750 can also be interfaced with mobile network platform 1710 through PS gateway node(s) 1722. Packet-switched gateway node(s) 1722 generates packet data contexts when a data session is established. To that end, in an aspect, PS gateway node(s) 1722 can include a tunnel interface (e.g., tunnel termination gateway (TTG) in 3GPP UMTS network(s) (not shown)) which can facilitate packetized communication with disparate wireless network(s), such as network platform and associated radio access network, Wi-Fi networks. It should be further appreciated that the packetized communication can include multiple flows that can be generated through service (e.g., provisioning) and application server(s) 1760. It is to be noted that in 3GPP UMTS network(s), PS gateway node(s) 1722 (e.g., GGSN) and tunnel interface (e.g., TTG) comprise a packet data gateway (PDG).

The mobile network platform 1710 also includes serving node(s) 1770 that convey the various packetized flows of data streams (e.g., content(s) or signaling directed to a subscribed data), received through PS gateway node(s) 1722. As an example, in a 3GPP UMTS network, serving node(s) 1770 can be embodied in serving GPRS support node(s) (SGSN).

Server(s) 1760 in mobile network platform 1710 can execute numerous applications (e.g., location services, online gaming, wireless banking, wireless device management . . . ) that can generate multiple disparate packetized data streams or flows, and manage (e.g., schedule, queue, format . . . ) such flows. Such application(s), for example can include add-on features to standard services provided by mobile network platform 1710. Data streams (e.g., content(s) or signaling directed to a file) can be conveyed to PS gateway node(s) 1722 for authorization/authentication and initiation of a data session, and to serving node(s) 1770 for communication thereafter.

Server(s) 1760 can also effect security (e.g., implement one or more firewalls) of mobile network platform 1710 to ensure network's operation and data integrity in addition to authorization and authentication procedures that CS gateway node(s) 1712 and PS gateway node(s) 1722 can enact. Moreover, server(s) 1760 can provision services from external network(s), e.g., WAN 1730, or Global Positioning System (GPS) network(s) (not shown). It is to be noted that server(s) 1760 can include one or more processors configured to confer at least in part the functionality of macro network platform 1710. To that end, the one or more processor can execute code instructions stored in memory 1720, for example.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, et cetera), optical disks (e.g., compact disk (CD), digital versatile disk (DVD), et cetera), smart cards, and flash memory devices (e.g., card, stick, key drive, et cetera). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

As used herein, the term "identifying information" is intended to be contact information known at the time a communication is connected relating to a party of the communication and can include (but is not limited to) telephone numbers, aliases, messenger names and identifiers, e-mail addresses, extensions, device personal identification numbers (PINs), distribution lists, network addresses, component addresses (e.g., medium access control (MAC) addresses, machine addresses, et cetera) or other component identifiers, user names, nicknames, domains, signatures (electronic, physical, and otherwise), references, forwarding configurations, and network addresses. The term "communication" as used when two or more devices correspond is intended to expansively capture all means of transmission or reception available to state-of-the-art devices and can include (but is not limited to) cellular, satellite transmission, VOIP and SIP voice connections, short message service (SMS) exchanges, broadcast data, network sessions, e-mails, instant messages, other network-based messaging, PIN or other device-based messaging, voicemail, picture mail, video mail, mixed-content correspondence, Unified Messaging (UM), and other digital and analog information transmitted between parties in any local and/or distant, physical and/or logical region.

Similarly, the concept of "data transmission" herein is intended to broadly represent known means of information exchange with digital or analog systems, including but not limited to hard-wired and direct connections (e.g., local media, universal serial bus (USB) cable, integrated drive electronics (IDE) cable, category 5 cable, coaxial cable, fiber optic cable and telephone cable), shared connections (e.g., remote and/or distributed resources) wireless connections (e.g., Wi-Fi, Bluetooth, infrared wireless, and personal area network connections), messaging systems (e.g., short message service (SMS), instant messaging, and other network-enabled other messaging), mobile or cellular transmissions and combinations thereof (e.g., personal communication system (PCS) and integrated networks), Unified Messaging, and other means of techniques of communication employed by telephones, personal digital assistants (PDAs), computers and network devices. "Mixed-content message," as used herein, is intended to represent communications employing one or more means of data transmission to present one or more varieties of device-capable content, including (but not limited to) picture messages, audio or video messages, and messages where text or other media types accompany one another. A "user device" can include, but is not limited to, data-enabled telephones (cellular telephones, smart phones, soft phones, VOIP and SIP phones, satellite phones, telephones coupled to computer systems, et cetera), communications receivers, personal digital assistants, pagers, portable e-mail devices, portable web browsers, media devices capable of receiving data, portable computers, and other electronics that allow a user to receive communications from other parties.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise historic data on previously served queries; communication party information from various sources; files and applications; and so forth. It is to be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of aspects of the claimed subject matter. It is, of course, not possible to describe every conceivable combination of components or methods for purposes of describing the claimed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim. Embodiments and examples provided in the foregoing are non-exhaustive and understood to capture similar functionality known as of the disclosures herein.

What is claimed is:

1. A method, comprising:
    obtaining, by a device comprising a processor, a set of subscriber data;
    generating, by the device, a data relationship by correlating a first subset of the set of subscriber data and a second subset of the set of subscriber data;
    determining, by the device, a scale having an index value associated with the set of subscriber data, wherein the index value is representative of a number of disconnection events expected in a defined location based on a percentage of total subscriber devices in the defined location; and
    displaying, by the device, the data relationship associated with the correlating of the first subset of the set of subscriber data and the second subset of the set of subscriber data based at least in part on the index value.

2. The method of claim 1, further comprising obtaining, by the device, a set of line number portability data.

3. The method of claim 2, wherein the generating the data relationship comprises correlating a third subset of the set of subscriber data with a subset of the set of line number portability data.

4. The method of claim 1, wherein the determining the scale comprises:
    determining a first quantity of subscriber devices, having a first characteristic, in a first defined geographic granularity;
    determining a second quantity of subscriber devices, having the first characteristic, in a second geographic granularity; and
    determining the index value based on a percentage of the second quantity of subscriber devices compared to the first quantity of subscriber devices.

5. The method of claim 4, further comprising selecting, by the device, for a first geographic granularity, a value for the first geographic granularity that is higher on a geographic granularity hierarchy than a second defined geographic granularity.

6. The method of claim 1, wherein the displaying the data relationship comprises displaying the data relationship as a heat map that places a greater emphasis on higher correlations between the first and second subsets relative to lower correlations between the first and second subsets, and wherein the higher correlations are determined to satisfy a defined correlation function, and the lower correlations are determined not to satisfy the defined correlation function.

7. The method of claim 1, wherein the displaying the data relationship comprises:
    determining that a value of the data relationship is within a defined range of the index value; and
    displaying a graphical representation associated with the defined range, wherein the displaying the graphical representation is in response to the value of the data relationship being determined to be within the defined range.

8. The method of claim 1, further comprising:
    obtaining, by the device, a display criterion; and
    displaying, by the device, first information indicative of the data relationship based at least in part on the display criterion.

9. The method of claim 8, further comprising:
    determining, by the device, an additional data relationship based on the display criterion; and
    displaying, by the device, second information indicative of the additional data relationship.

10. A system, comprising:
a processor; and
a memory that stores executable instructions that, when executed by the processor, facilitate performance of operations, comprising:
  receiving a set of subscriber data;
  evaluating at least a first subset of the set of subscriber data;
  generating a set of analysis data based at least in part on the evaluating of at least the first subset of the set of subscriber data;
  setting an index value based on a comparison of a first amount of subscriber identities having a characteristic at a first defined geographic granularity level to a second amount of subscriber identities having the characteristic at a second defined geographic granularity level; and
  graphically rendering first information indicative of the set of analysis data.

11. The system of claim 10, wherein the operations further comprise receiving a set of portability data.

12. The system of claim 11, wherein the evaluating comprises evaluating a subset of the set of portability data, and wherein the generating comprises generating the set of analysis data based at least in part on the evaluating of the subset of the set of portability data.

13. The system of claim 10, wherein the operations further comprise determining the index value for the set of analysis data.

14. The system of claim 13, wherein the operations further comprise:
  determining the first amount of subscriber identities, having the characteristic, at the first defined geographic granularity level; and
  determining the second amount of subscriber identities, having the characteristic, at the second defined geographic granularity level.

15. The system of claim 14, wherein the first defined geographic granularity level is higher than the second geographic granularity level on a geographic granularity level hierarchy.

16. The system of claim 10, wherein the operations further comprise graphically rendering second information indicative of the set of analysis data as a heat map.

17. The system of claim 10, wherein the system comprises an electronic device comprising the processor, and the set of subscriber data is obtained by the electronic device via a network connection.

18. A method, comprising:
  receiving, by a system comprising a processor, subscriber data;
  receiving, by the system, line number portability data;
  generating, by the system, analysis data by associating the subscriber data and the line number portability data;
  determining, by the system, a first index value for the analysis data, wherein the determining comprises controlling the first index value based on a first number of subscribers divided by a second number of subscribers;
  displaying, by the system, information indicative of the analysis data based at least in part on the index value; and
  determining, by the system, a scale having a second index value associated with the subscriber data, wherein the second index value is associated with disconnection events predicted in a defined location based on a percentage of total subscribers determined to be in the defined location.

19. The method of claim 18, wherein the determining the index value comprises:
  quantifying, prior to the controlling, the second number of subscribers associated with the subscriber data, having a set of characteristics, at a first location, and
  quantifying, prior to the controlling, the first number of subscribers associated with the subscriber data, having the set of characteristics, at a second location which includes the first location.

20. The method of claim 19, wherein the displaying the information indicative of the analysis data based at least in part on the index value comprises:
  determining that the value of the analysis data is within a defined range of the index value and
  initiating display of a graphical representation associated with the defined range in response to the value of the analysis data being within the defined range.

* * * * *